US012810495B2

(12) United States Patent
Ungureanu-Contes et al.

(10) Patent No.: US 12,810,495 B2
(45) Date of Patent: Nov. 24, 2026

(54) GENERATING SCALABLE VECTOR TEXT EFFECTS

(71) Applicant: ADOBE INC., San Jose, CA (US)

(72) Inventors: Adrian-Stefan Ungureanu-Contes, Bucharest (RO); Marian Lupascu, Bucharest (RO); Vlad-Constantin Lungu-Stan, Bucharest (RO); Ionut Mironică, Bucharest (RO)

(73) Assignee: ADOBE INC., San Jose, CA (US)

( * ) Notice: Subject to any disclaimer, the term of this patent is extended or adjusted under 35 U.S.C. 154(b) by 157 days.

(21) Appl. No.: 18/631,521

(22) Filed: Apr. 10, 2024

(65) Prior Publication Data

US 2025/0322561 A1 Oct. 16, 2025

(51) Int. Cl.
*G06T 11/10* (2026.01)
*G06T 11/60* (2026.01)

(52) U.S. Cl.
CPC .............. *G06T 11/10* (2026.01); *G06T 11/60* (2013.01)

(58) Field of Classification Search
CPC ......... G06T 11/001; G06T 11/60; G06T 5/50; G06T 5/70; G06T 5/60; G06T 2207/20081; G06T 2207/20084; G06T 2207/20221; G06T 2200/24; G06T 2210/36; G06T 2210/32; G06T 7/11; G06T 11/20; G06V 20/70; G06V 10/764; G06V 10/774; G06V 10/82; G06F 40/166; G06F 40/186; G06F 40/40; G06F 16/532; G06F 16/535; G06F 16/58; G06F 16/3334; G06F 3/04845; G06F 3/0482; G06F 3/04847
See application file for complete search history.

(56) References Cited

U.S. PATENT DOCUMENTS

| | | | | |
|---|---|---|---|---|
| 8,189,866 | B1 * | 5/2012 | Gu | G06V 40/20 348/169 |
| 10,565,757 | B2 * | 2/2020 | Oxholm | G06N 3/0464 |
| 12,205,207 | B2 * | 1/2025 | Smetanin | H04L 51/10 |
| 12,235,891 | B2 * | 2/2025 | Zhang | G06F 16/3334 |
| 12,271,983 | B2 * | 4/2025 | Zhang | G06T 11/60 |
| 12,430,829 | B2 * | 9/2025 | Xie | G06T 7/11 |
| 2020/0364913 | A1 | 11/2020 | Bradski | |
| 2022/0169623 | A1 * | 6/2022 | Liu | C07D 293/08 |
| 2022/0413688 | A1 | 12/2022 | Guy et al. | |
| 2022/0414949 | A1 | 12/2022 | Guan et al. | |
| 2023/0135978 | A1 | 5/2023 | Price et al. | |

(Continued)

OTHER PUBLICATIONS

Yuting Ma et al., "Text Style Transfer With Decorative Elements", 2021, IEEE 4th International Conference on Multimedia Information Processing and Retrieval (MIPR), pp. 330-336 (Year: 2021).*

(Continued)

*Primary Examiner* — Wesner Sajous

(74) *Attorney, Agent, or Firm* — F. CHAU & ASSOCIATES, LLC

(57) ABSTRACT

A method, apparatus, non-transitory computer readable medium, and system for image processing include obtaining a pattern prompt and a text image, where the pattern prompt describes a visual pattern and the text image depicts text, generating a pattern image based on the pattern prompt, where the pattern image depicts the visual pattern, and generating a patterned text image based on the pattern image and the pattern prompt.

18 Claims, 16 Drawing Sheets

(56) References Cited

U.S. PATENT DOCUMENTS

| | | | | |
|---|---|---|---|---|
| 2023/0267652 | A1* | 8/2023 | Lupascu | G06T 11/00 345/428 |
| 2024/0127510 | A1 | 4/2024 | Darabi et al. | |
| 2024/0282025 | A1* | 8/2024 | Park | G06F 40/151 |
| 2024/0331235 | A1* | 10/2024 | Smock | G16C 20/70 |
| 2024/0338870 | A1* | 10/2024 | Iyer | G06T 11/60 |
| 2024/0404013 | A1* | 12/2024 | Zhou | G06T 9/00 |
| 2024/0420389 | A1* | 12/2024 | Batra | G06T 3/4038 |
| 2025/0095227 | A1* | 3/2025 | Ungureanu-Contes | G06T 11/00 |
| 2025/0095256 | A1* | 3/2025 | Lungu-Stan | G06T 11/60 |
| 2025/0111139 | A1* | 4/2025 | Mironica | G06T 11/60 |
| 2025/0117967 | A1* | 4/2025 | Tambi | G06F 40/166 |
| 2025/0292463 | A1* | 9/2025 | Wu | G06T 11/60 |
| 2025/0299396 | A1* | 9/2025 | Ji | G06F 40/109 |

OTHER PUBLICATIONS

Shaoan Xie et al, "SmartBrush: Text and Shape Guided Object In painting with Diffusion Model", Dec 9, 2022, Adobe Research, pp. 1-10 (Year: 2022).*

Dehouche, et al., "What's in a Text-to-Image Prompt? The Potential of Stable Diffusion in Visual Arts Education", 2023, arXiv, p. 1-11, https://doi.org/10.48550/arXiv.2301.01902 (Year: 2023).

Ma, et al., "Text Style Transfer With Decorative Elements", 2021, 2021 IEEE 4th International Conference on Multimedia Information Processing and Retrieval (MIPR), p. 330-336, https://doi.org/10.1145/3544903.3544906 (Year: 2021).

Xie, et al., "SmartBrush: Text and Shape Guided Object Inpainting with Diffusion Model", 2022, arXiv, p. 1-10, https://doi.org/10.48550/arXiv.2212.05034 (Year: 2022).

Office Action dated Jun. 2, 2025 in related U.S. Appl. No. 18/479,379.

1Couairon, et al. "DiffEdit: Diffusion-Based Semantic Image Editing with Mask Guidance", arXiv preprint arXiv:2210.11427v1 [cs.CV] Oct. 20, 2022, 21 pages.

2Meng, et al., "SEDdit: Guided Image Synthesis and Editing with Stochastic Differential Equations", arXiv preprint arXiv:2108.01073v2 [cs.CV] Jan. 5, 2022, 33 pages.

3Ramesh, et al., "Hierarchical Text-Conditional Image Generation with Clip Latents", arXiv preprint arXiv:2204.06125v1 [cs.CV] Apr. 13, 2022, 27 pages.

4Radford, et al., "Learning Transferable Visual Models from Natural Language Supervision", In International conference on machine learning (pp. 8748-8763), (Jul. 2021), PMLR.

5Balaji, et al., "eDiffi: Text-to-Image Diffusion Models with an Ensemble of Expert Denoisers", arXiv preprint arXiv:2211.01324v5 [cs.CV] Mar. 14, 2023, 24 pages.

6https://github.com/LAION-AI/aesthetic-predictor.

7Saharia, et al., "Photorealistic Text-to-Image Diffusion Models with Deep Language Understanding", Advances in Neural Information Processing Systems, 35, 2022, pp. 36479-36494.

8Rombach, et al., "High-Resolution Image Synthesis with Latent Diffusion Models", In Proceedings of the IEEE/CVF conference on computer vision and pattern recognition, (2022), (pp. 10684-10695).

Combined Search and Examination Report in related United Kingdom Patent Application No. GB2407653.1, 5 pages.

* cited by examiner

GENERATING SCALABLE VECTOR TEXT EFFECTS

BACKGROUND

The following relates generally to image processing, and more specifically to image generation using a machine learning model. Image processing refers to the use of a computer to edit an image using an algorithm or a processing network. In some cases, image processing software can be used for various image processing tasks, such as image restoration, image detection, image compositing, image editing, and image generation. For example, image generation includes the use of the machine learning model to generate an image based on a text prompt.

Vector images are scalable images that encode shapes using a set points, lines, curves, polygons, etc. They are useful in applications where images are scaled to a variety of sizes. However, many image generation models generate pixel images that are not as scalable as vector images.

SUMMARY

Aspects of the present disclosure provide methods, non-transitory computer readable media, apparatuses, and systems for image processing. Aspects of the present disclosure include a two-step process that generates a patterned text image based on a text prompt. For example, the first step of the two-step process includes an image generation model trained to generate a pattern image based on a text prompt. The second step of the two-step process includes generating a preliminary patterned text image based on the pattern image and a text image mask. In one aspect, the image generation model generates a patterned text image based on the preliminary patterned text image and a conditioning embedding of the text prompt. By generating the patterned text image using the two-step process, the image generation model can generate patterned text faster and maintain the pattern consistency of each patterned text depicted in the patterned text image.

A method, apparatus, non-transitory computer readable medium, and system for image processing are described. One or more aspects of the method, apparatus, non-transitory computer readable medium, and system include obtaining a pattern prompt and a text image, where the pattern prompt describes a visual pattern and the text image depicts text. One or more aspects further include generating, using an image generation model, a pattern image based on the pattern prompt, where the pattern image depicts the visual pattern. One or more aspects further include generating, using the image generation model, a patterned text image based on the pattern image and the pattern prompt.

A method, apparatus, non-transitory computer readable medium, and system for image processing are described. One or more aspects of the method, apparatus, non-transitory computer readable medium, and system include obtaining a training set that includes a ground-truth pattern image and a pattern prompt, where the ground-truth pattern image depicts a visual pattern and the pattern prompt describes the visual pattern. One or more aspects further include training, using the training set, an image generation model to generate patterned text images.

An apparatus and system for image processing are described. One or more aspects of the apparatus and system include at least one processor and at least one memory storing instructions executable by the at least one processor. One or more aspects of the apparatus and system further include an image generation model comprising parameters stored in the at least one memory and trained to generate a pattern image based on a pattern prompt, where the pattern image depicts a visual pattern, and trained to generate a patterned text image based on the pattern image and the pattern prompt.

DETAILED DESCRIPTION

Figure 1:
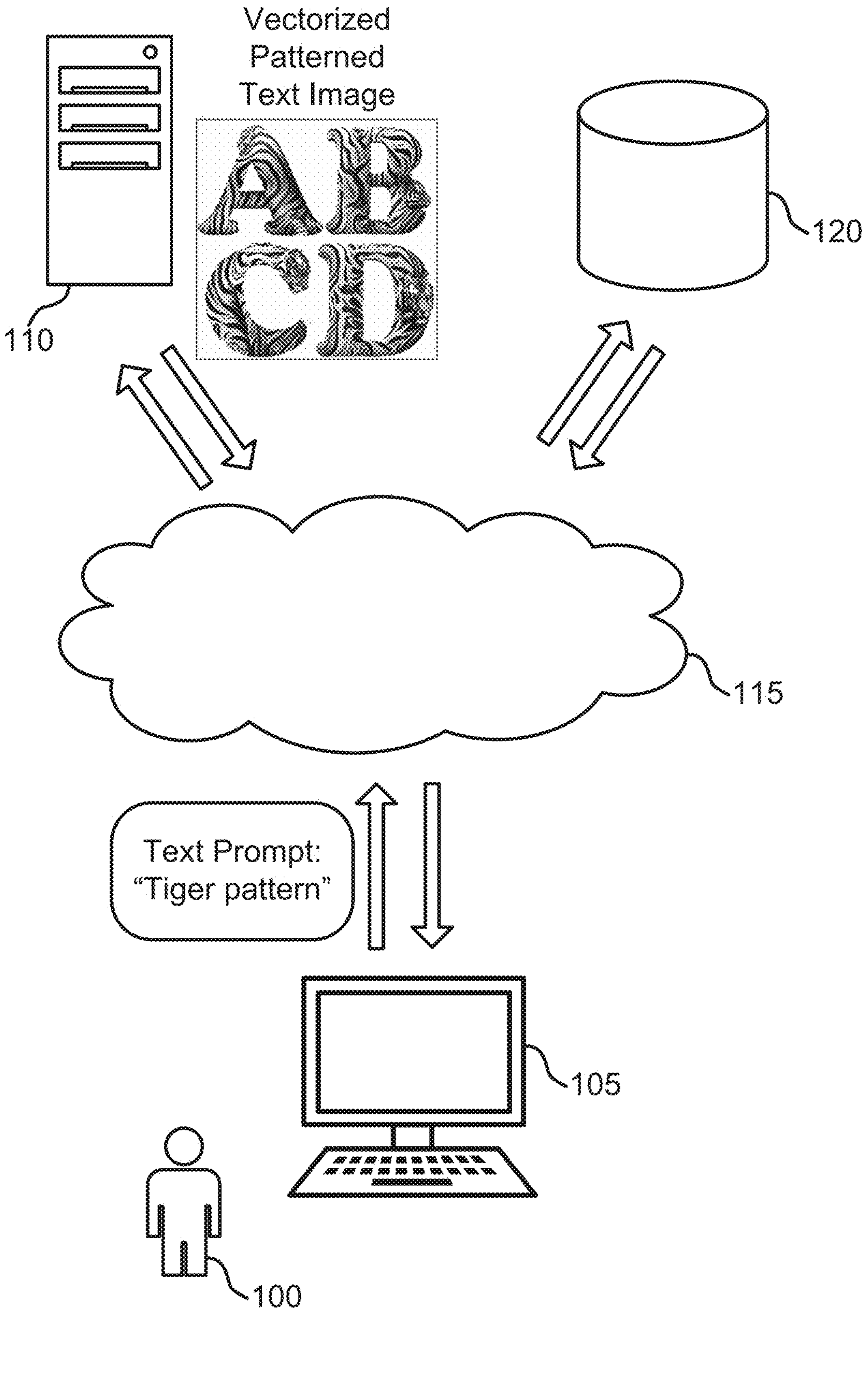
FIG. 1 shows an example of an image processing system according to aspects of the present disclosure.

Aspects of the present disclosure provide methods, non-transitory computer readable media, apparatuses, and systems for image processing. Aspects of the present disclosure include a two-step process that generates a patterned text image based on a text prompt. For example, the first step of the two-step process includes an image generation model trained to generate a pattern image based on a text prompt. The second step of the two-step process includes generating a preliminary patterned text image based on the pattern image and a text image mask. In one aspect, the image generation model generates a patterned text image based on the preliminary patterned text image and a conditioning embedding of the text prompt. By generating the patterned text image using the two-step process, the image generation model can generate patterned text faster and maintain the pattern consistency of each patterned text depicted in the patterned text image.

A subfield in image processing is generating text effects. The use of text effects is a powerful tool in visual communication, which allows a user to add artistic modifications to text to enhance the expressive impact. For example, by combining various visual elements such as outlines, colors, and textures, text transcends from being mere words into a captivating and multisensory experience. Despite the extensive utilization of these text effects in the design industry, the intricate nature of text effect generation has been predominantly limited to experienced human experts. As a result, the process of text effect generation is labor-intensive and impractical for an average user.

In some cases, text effect generation includes the use of a machine learning model or computer vision. As a result, complex and visually striking text effects can be generated and presented to a potential user. However, despite the advancements in text effect generation, automated text effect generation still encounters challenges such as, for example, the lack of comprehensive and diverse datasets.

Conventional models generate text effects using GAN-based generative models. For example, a conventional approach uses a stacked conditional GAN model that transfers typographic and textual stylization by transferring the style of given glyphs to unseen ones and capturing intricate font styles found in real-world contexts such as movie posters and infographics. In another example, a conventional approach automatically generates coherent and realistic glyph images for artistic fonts by categorizing style transferring into glyph synthesis and texture transfer groups. In another example, a conventional approach enables artistic text style transfer by separately transferring front and texture styles from different source images to target images in an unsupervised manner.

In another example, a conventional approach uses a deep neural network to automatically synthesize high-quality text effects on arbitrary glyphs. For example, the text effects include elements such as colors, outlines, shadows, and textures applied to text, which are commonly used in graphic design. However, this approach involves manual editing and is labor-intensive. In another example, a conventional approach covers various text effects on English letters, Chinese characters, and Arabic numerals, by using feature disentanglement and a self-stylization training scheme.

In another example, a conventional approach trains a segmentation network to detect decorative elements and separates the decorative elements from basal text effects. Then, a style transfer network is used to infer the basal text effects. In addition, the conventional approach uses domain adaptation and one-shot training for versatility.

Despite the various approaches in text effect generation, conventional models are not capable of generating vectorial text effects because of the presence of gradients or very fine realistic details. In addition, text effects generated using the conventional models may depict inconsistent color, poorly defined edges, or low overall quality. For example, conventional models apply style transfer to each text character individually, and thus, the pattern of the text effects is inconsistent.

Accordingly, the present disclosure describes a method and a system that automatically generates a scalable vectorized text effect based on a text prompt using a machine learning model. In one aspect, the machine learning model outputs vectorized text effects that can be converted into an SVG file and resized in a lossless manner. In some aspects, the machine learning model generates intrinsically coherent outputs, which maintain the style, pattern, or texture across text characters regardless of the font. In some aspects, the machine learning model can modify and control the degrees of details in the output text effects.

According to some aspects, the image generation model of the present disclosure generates the pattern image based on a conditioning embedding pair of the text prompt. In one aspect, a prior model generates an image embedding based on the text embedding. A language model generates a text embedding based on a modified text prompt of the text prompt. The image embedding and the text embedding are combined into a positive conditioning embedding. In one aspect, the language model generates a negative conditioning embedding based on a pre-determined text prompt. The conditioning embedding pair includes the positive conditioning embedding and the negative conditioning embedding. By using the conditioning embedding pair, the image generation model can accurately generate an image depicting a pattern or texture described by the text prompt.

According to some aspects, the machine learning model generates a text image mask based on a text input including one or more text characters, letters, or symbols. For example, the machine learning model arranges the text input on the text image mask so that the background (or empty space) of the text image mask is minimized. By minimizing the background of the text image mask, the number of pixels of each text character of the text input is increased. In one aspect, the machine learning model combines the pattern image and the text image mask to generate a preliminary patterned text image. The image generation model generates the patterned text image based on the preliminary patterned text image and the conditioning embedding pair. Accordingly, by minimizing the background of the text image mask, the image generation model can generate the patterned text image having increased quality.

According to some aspects, the machine learning model can control the degrees of details in the output text effects by adjusting the number of diffusion steps. According to some aspects, a data preparation component obtains a training dataset, where the machine learning model is trained based on the training dataset. According to some aspects, a training component independently trains the image generation model, the prior model, and an upsampling model of the machine learning model using the training dataset. By finetuning these models of the machine learning model using the training dataset, the machine learning model is trained to generate vectorized text effects.

Figure 15:
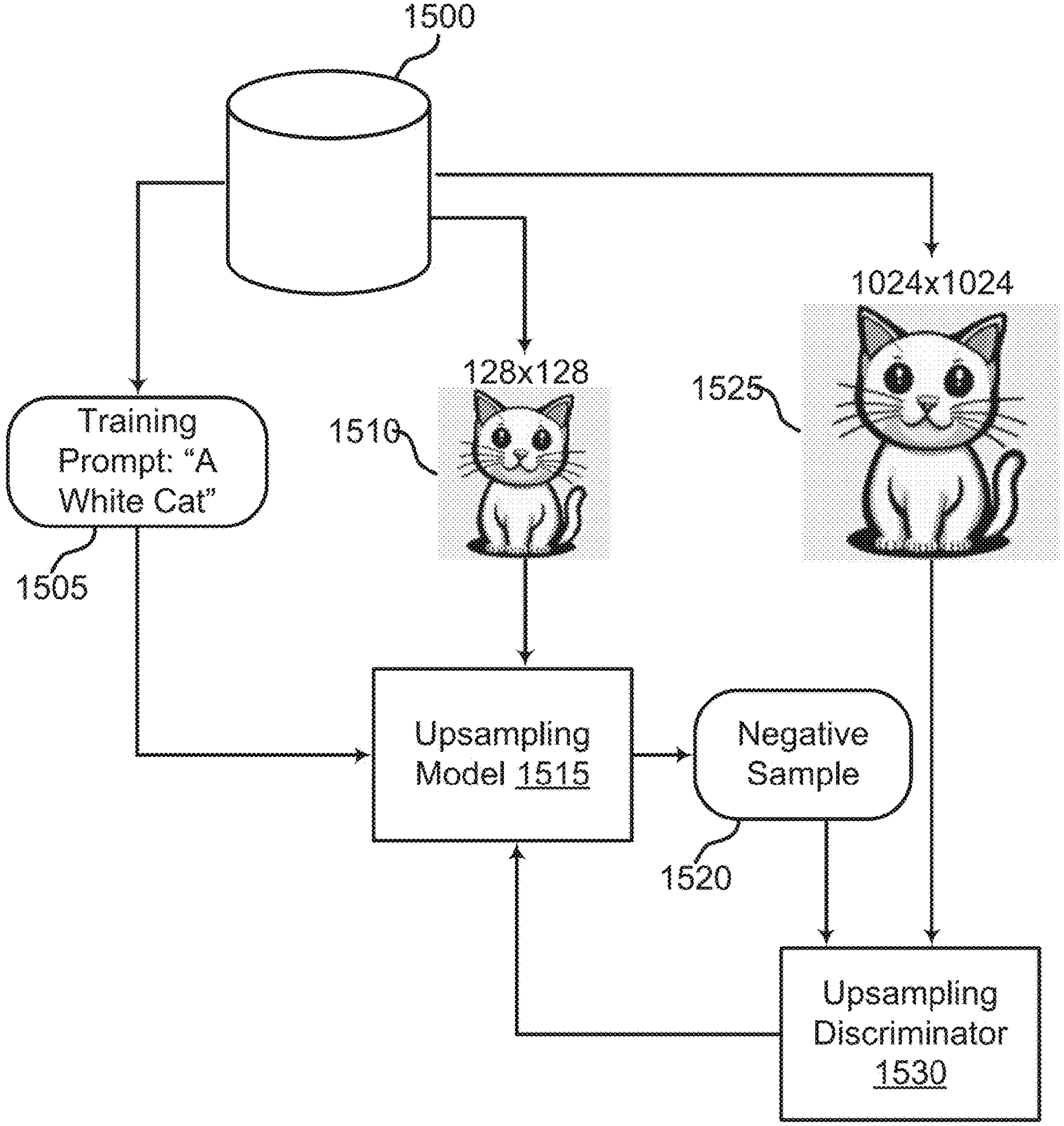
FIG. 15 shows an example of training an upsampling model according to aspects of the present disclosure.
Figure 16:
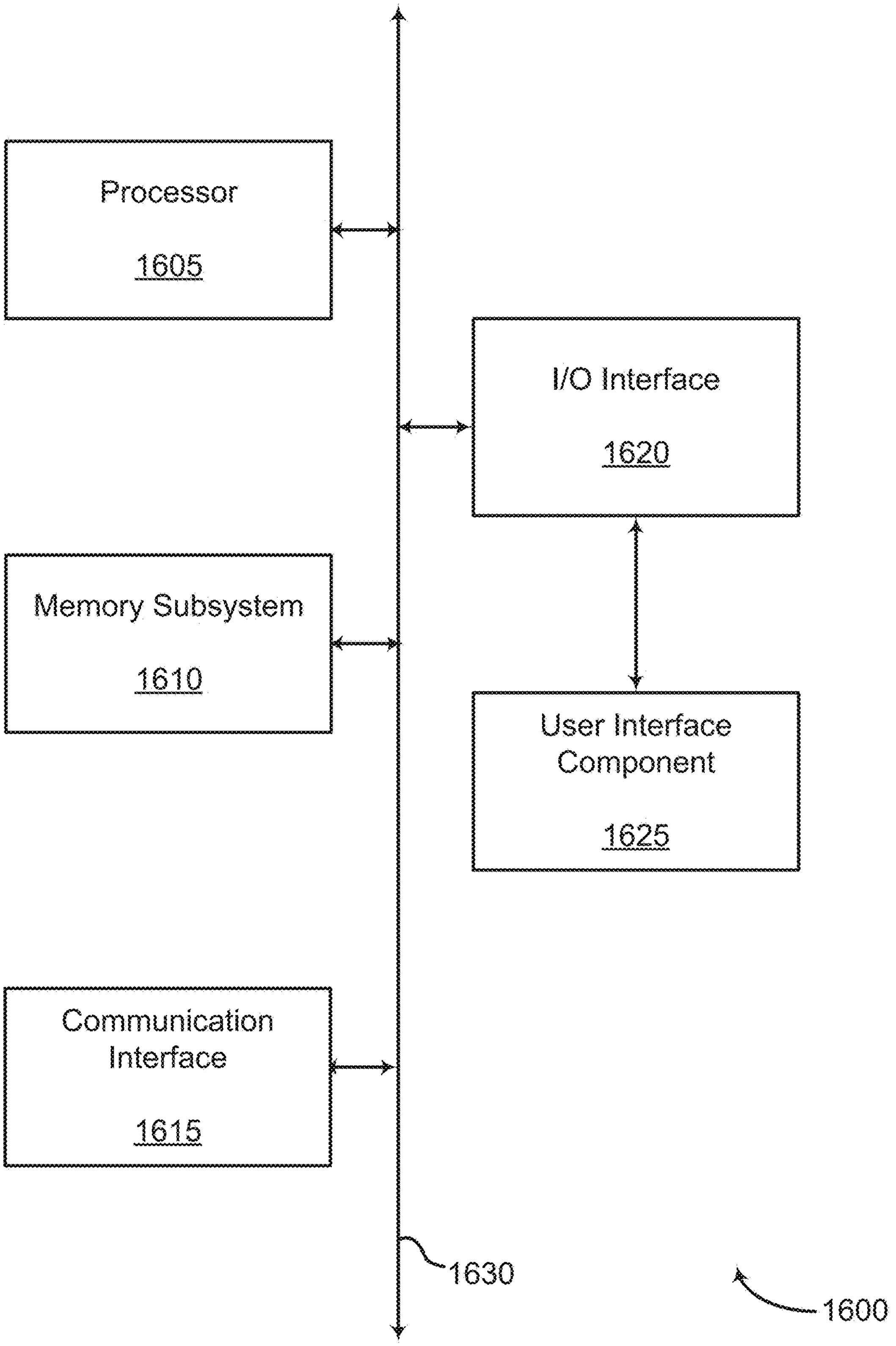
FIG. 16 shows an example of a computing device according to aspects of the present disclosure.

An example system of the inventive concept in image processing is provided with reference to FIGS. 1 and 16. An example application of the inventive concept in image processing is provided with reference to FIGS. 3-4. Details regarding the architecture of an image processing apparatus are provided with reference to FIGS. 6-8. An example of a process for image processing is provided with reference to FIGS. 2, 5, and 9-10. A description of an example training process is provided with reference to FIGS. 11-15.

Embodiments of the present disclosure include systems and methods that improve on conventional image generation models by generating vectorized text effects faster and more accurately. For example, in contrast to conventional models that search for styles, patterns, or textures described by the text prompt and apply a style transfer to the text using the search, a machine learning model of the present disclosure is trained to generate a pattern or texture described by the text prompt and then to generate a patterned text image having text effects based on the pattern image. As a result, the output more closely matches the target output and the time required for generating text effects is significantly reduced. Since a same pattern image can be used to generate multiple pattern text images (i.e., corresponding to multiple characters) a consistent pattern can be used throughout the text while maintaining diversity of how the patter is applied to each character (by using the generative model). Furthermore, the generated images can be converted to vector images to achieve a higher degree of scalability.

According to some aspects, the generated text effects can be converted into an SVG file through post-processing and resized without compromising the overall quality of the text effects. In some aspects, the generated text effects have a consistent pattern, consistent style, consistent texture, defined edges, and increased overall quality. In some aspects, the data preparation process of the present disclosure can be used to complement (e.g., increase the performance of) an existing image generation model. For example, by training the machine learning model using the training data, embodiments of the present disclosure can reduce processing time in generating pattern images and text effects.

Text Effect Generation

In FIGS. 1-5 and 9-10, a method, apparatus, non-transitory computer readable medium, and system for image processing are described. One or more aspects of the method, apparatus, non-transitory computer readable medium, and system include obtaining a pattern prompt and a text image, where the pattern prompt describes a visual pattern and the text image depicts text. One or more aspects further include generating, using an image generation model, a pattern image based on the pattern prompt, where the pattern image depicts the visual pattern. One or more aspects further include generating, using the image generation model, a patterned text image based on the pattern image and the pattern prompt.

Some examples of the method, apparatus, non-transitory computer readable medium, and system further include generating a positive conditioning embedding based on the pattern prompt. Some examples further include generating a negative conditioning embedding based on a negative prompt, where the image generation model generates the pattern image based on the positive conditioning embedding and the negative conditioning embedding. In some aspects, the image generation model generates the patterned text image based on the positive conditioning embedding and the negative conditioning embedding.

Some examples of the method, apparatus, non-transitory computer readable medium, and system further include combining the pattern image and the text image to obtain a preliminary patterned text image, where the patterned text image is generated based on the preliminary patterned text image. Some examples of the method, apparatus, non-transitory computer readable medium, and system further include arranging a plurality of characters of the text to minimize a background region of the text image.

Some examples of the method, apparatus, non-transitory computer readable medium, and system further include generating a vector patterned text image based on the patterned text image. Some examples of the method, apparatus, non-transitory computer readable medium, and system further include upscaling the patterned text image to obtain an upscaled patterned text image, where the vector patterned text image is generated based on the upscaled patterned text image. Some examples of the method, apparatus, non-transitory computer readable medium, and system further include segmenting the patterned text image to obtain a plurality of patterned character images, where the vector patterned text image is generated based on the plurality of patterned character images. In some aspects, the image generation model is trained to generate text effects.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 6.

Referring to FIG. 1, user 100 provides a text prompt to image processing apparatus 110 via user device 105 and cloud 115. For example, the text prompt states "Tiger pattern." In some cases, the text prompt is referred to as a pattern prompt. In response, a machine learning model of image processing apparatus 110 generates a pattern image based on the text prompt. For example, the pattern image may depict a pattern of black, brown, and white strokes representing the skin of a tiger. In some cases, user 100 provides a text (e.g., text character, English alphabet, font, letter, words, or sentences) to image processing apparatus 110 via user device 105 and cloud 115. In some embodiments, the machine learning model generates a text image mask based on the text. The machine learning model generates a patterned text image based on the pattern image and the text image mask. For example, the patterned text image includes an element described by the text prompt and the text. In some embodiments, the patterned text image is post-processed to generate a vectorized patterned text image. Image processing apparatus 110 displays the patterned text image (or vectorized patterned text image) to user 100 via user device 105 and cloud 115.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may include a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIG. 6. According to some aspects, image processing apparatus 110 includes a computer-implemented network comprising a machine learning model, a prior model, a language model, an image generation model, an upsampling model, a segmentation model, and a vectorization component. Image processing apparatus 110 further includes a processor unit, a memory unit, an I/O module, a training component, and a data preparation component. In one aspect, the training component includes a text encoder and an image encoder. In some embodiments, image processing apparatus 110 further includes a communication interface, user interface components, and a bus as described with reference to FIG. 16. Additionally, image processing apparatus 110 communicates with user device 105 and database 125 via cloud 115. Further detail regarding the operation of image processing apparatus 110 is provided with reference to FIG. 2.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores training data including a ground-truth pattern image and a pattern prompt. In some cases, database 120 stores training data including a text prompt and a corresponding image. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

Figure 2:
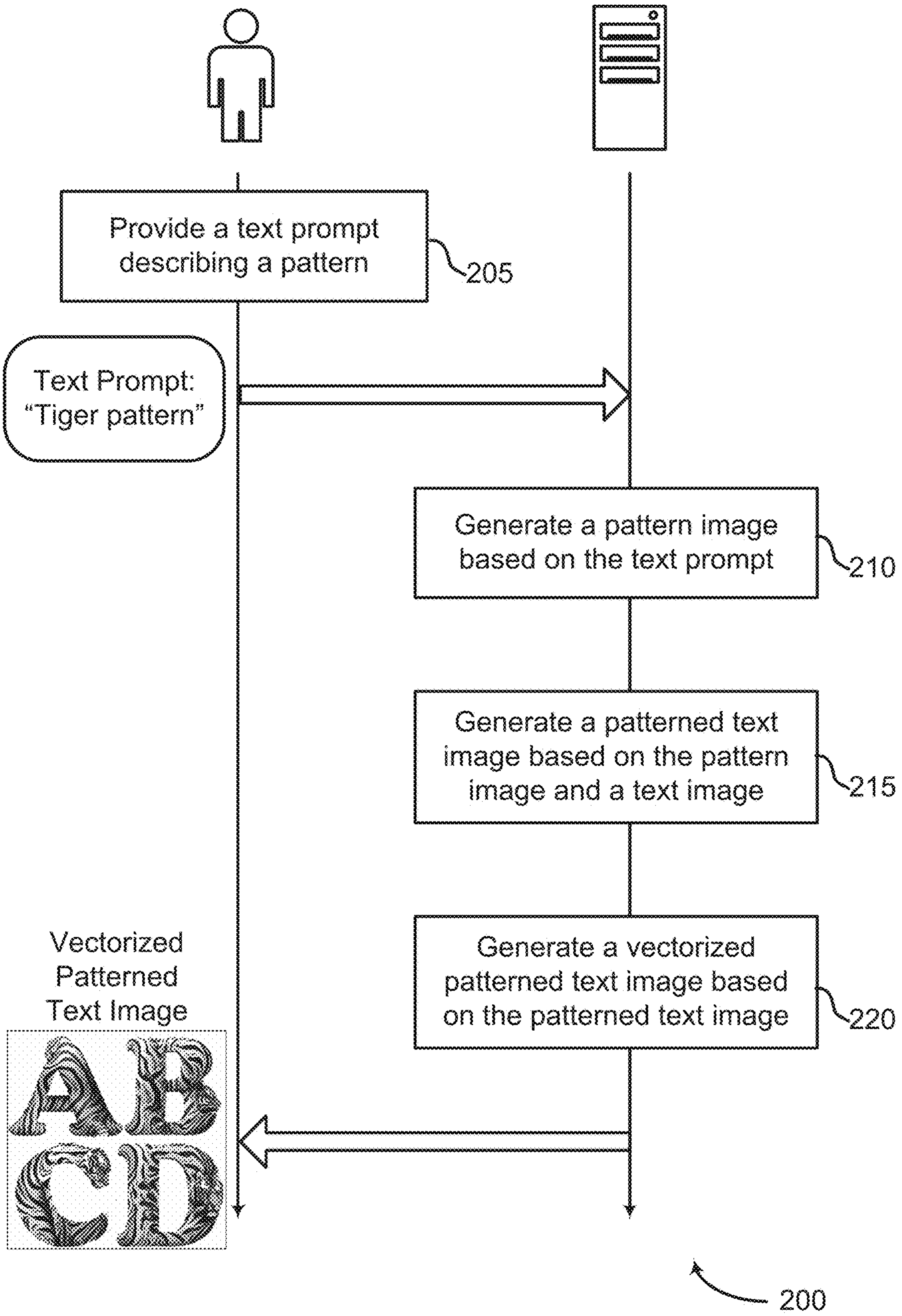
FIG. 2 shows an example of a method for generating vectorized patterned text according to aspects of the present disclosure.

FIG. 2 shows an example of a method 200 for generating vectorized patterned text according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user (e.g., the user described with reference to FIG. 1) provides a text prompt to the image processing apparatus (e.g., the image processing apparatus described with reference to FIGS. 2 and 6). For example, the text prompt describes a pattern or a texture such as "Tiger pattern." The image processing apparatus generates a pattern image based on the text prompt. In some cases, the user may provide a text including one or more text characters. The image processing apparatus arranges the text characters of text into a text image (or text image mask). The image processing apparatus generates a patterned text image based on the pattern image and the text image. The image processing apparatus displays the patterned text image to the user.

In some embodiments, the patterned text image is used in a post-processing step to generate a vectorized patterned text image. For example, the image processing apparatus upscales, segments, and/or vectorizes the patterned text image to generate the vectorized patterned text image. The image processing apparatus displays the vectorized patterned text image to the user.

At operation 205, the system provides a text prompt describing a pattern. In some cases, the operations of this step refer to, or may be performed by, a user as described with reference to FIG. 1. For example, the user provides a text prompt describing a pattern, such as "Tiger pattern" to image processing apparatus via a user interface provided by the image processing apparatus on a user device (e.g., the user device described with reference to FIG. 1). In some cases, the user may provide multiple text prompts to the image processing apparatus.

At operation 210, the system generates a pattern image based on the text prompt. In some cases, the operations of this step refer to, or may be performed by, an image processing apparatus as described with reference to FIGS. 1 and 6. In some cases, the operations of this step refer to, or may be performed by, an image generation model as described with reference to FIGS. 3, 4, 6, 7, and 14. For example, the image generation model is trained to generate the pattern image based on the text prompt describing a pattern. In some cases, the image generation model receives a conditioning embedding pair based on the text prompt and generates the patterned image. Further detail on generating the pattern image is described with reference to FIG. 7.

At operation 215, the system generates a patterned text image based on the pattern image and a text image. In some cases, the operations of this step refer to, or may be performed by, an image processing apparatus as described with reference to FIGS. 1 and 6. In some cases, the operations of this step refer to, or may be performed by, an image generation model as described with reference to FIGS. 3, 4, 6, 7, and 14. For example, the user provides a text including one or more text characters to the image processing apparatus. The image processing apparatus arranges the one or more text characters into the text image. In some embodiments, the text image and pattern image are combined into a preliminary patterned text image. The image generation model receives the preliminary patterned text image and the conditioning embedding pair to generate the patterned text image. Further detail on generating the patterned text image is described with reference to FIG. 7.

At operation 220, the system generates a vectorized patterned text image based on the patterned text image. In some cases, the operations of this step refer to, or may be performed by, an image processing apparatus as described with reference to FIGS. 1 and 6. In some cases, the operations of this step refer to, or may be performed by, a vectorization component as described with reference to FIGS. 3, 6, and 7. In some embodiments, the patterned text image is used in post-processing to generate the vector patterned text image. For example, an upsampling model upscales the patterned image. A segmentation component segments the upscaled patterned image. A vectorization component performs vectorization on the segmented patterned image to generate the vectorized patterned text image. Further detail on post-processing is described with reference to FIG. 7.

Figure 3:
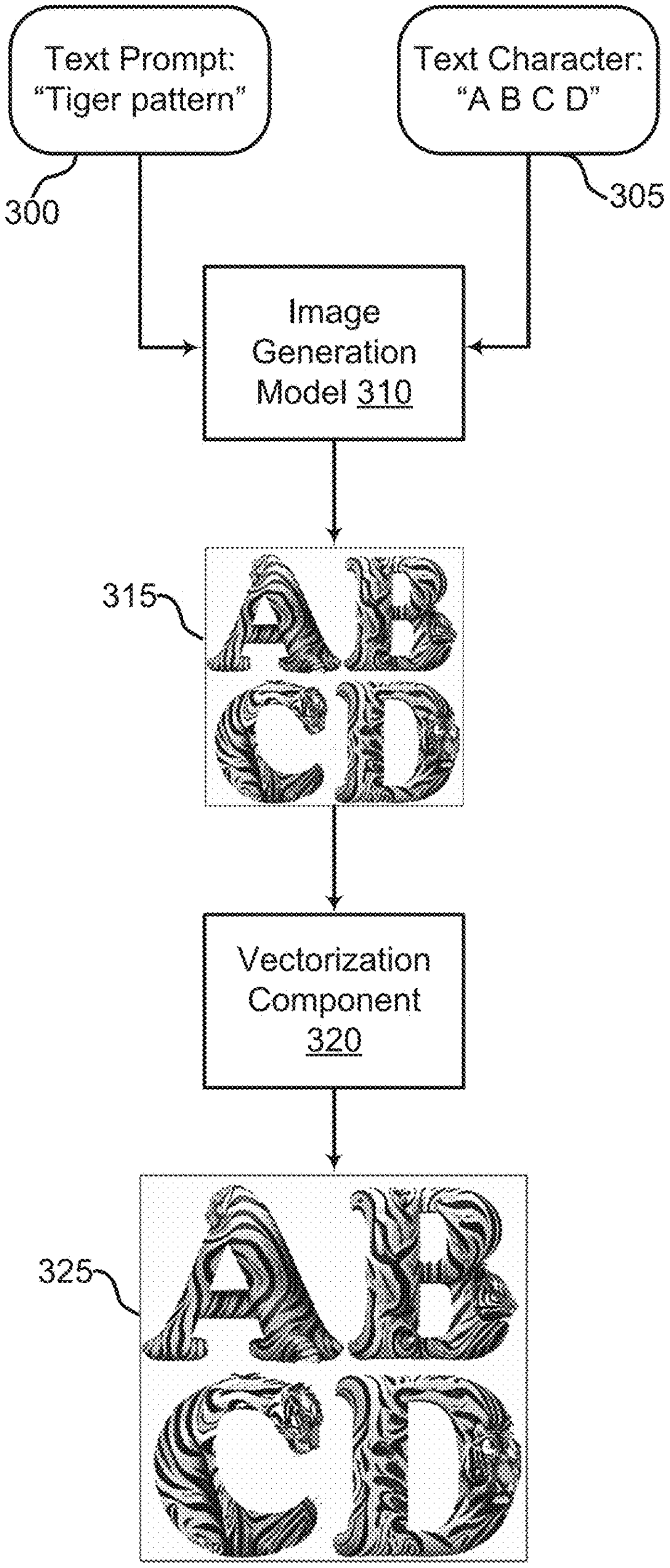
FIG. 3 shows an example of text to scalable vector text effect according to aspects of the present disclosure.

FIG. 3 shows an example of text to scalable vector text effect according to aspects of the present disclosure. The example shown includes text prompt 300, text character 305, image generation model 310, patterned text image 315, vectorization component 320, and vectorized patterned text image 325.

Referring to FIG. 3, image generation model 310 receives text prompt 300 and text character 305. For example, text prompt 300 describes a pattern such as "Tiger prompt" and text character 305 includes a plurality of characters "A, B, C, D." In some embodiments, the machine learning model generates a text image (or text image mask) based on text character 305. For example, each of the plurality of characters is arranged on the text image such that a background region of the text image is minimized. Further detail on minimizing a background region of the text image is described with reference to FIG. 7.

In some embodiments, the machine learning model generates a conditioning embedding pair based on the text prompt. For example, the conditioning embedding pair includes a positive conditioning embedding and a negative conditioning embedding. In some cases, the positive conditioning embedding guides the image generation model 310 to generate an image closely correlated to the positive conditioning embedding. In some cases, the negative conditioning embedding guides image generation model 310 to generate an image that negatively correlates and avoids a negative condition. Further detail on conditioning embedding pair is described with reference to FIG. 7.

Image generation model 310 generates a pattern image based on text prompt 300. In some cases, a first image generation model is used to generate the pattern image. Then, image generation model 310 generates patterned text image 315 based on the pattern image, text character 305, and conditioning embedding pair of text prompt 300. In some cases, a second image generation model is used to generate patterned text image 315. In some embodiments, the first image generation model and the second image generation model are the same model. In some embodiments, the first image generation model and the second image generation model are different models.

In some embodiments, patterned text image 315 is used in post-processing to generate vectorized patterned text image 325. For example, vectorization component 320 receives patterned text image 315 to generate vectorized patterned text image 325. In some embodiments, patterned text image 315 is upscaled using an upsampling component (e.g., the upsampling component described with reference to FIGS. 6, 7, and 15) to obtain an upscaled patterned text image. For example, vectorized patterned text image 325 is generated based on the upscaled patterned text image. In some embodiments, a segmentation component (e.g., the segmentation component described with reference to FIGS. 6 and 7) segments patterned text image 315 to generate a plurality of patterned character images. For example, vectorized patterned text image 325 is generated based on the plurality of patterned character images. Further detail on post-processing is described with reference to FIG. 7.

Text prompt 300 is an example of, or includes aspects of, the corresponding element described with reference to FIGS. 4, 7, and 8. Image generation model 310 is an example of, or includes aspects of, the corresponding element described with reference to FIGS. 4, 6, 7, and 14. Patterned text image 315 is an example of, or includes aspects of, the corresponding element described with reference to FIG. 7.

Vectorization component 320 is an example of, or includes aspects of, the corresponding element described with reference to FIGS. 6 and 7. Vectorized patterned text image 325 is an example of, or includes aspects of, the corresponding element described with reference to FIG. 7. Vectorized patterned text image 325 is an example of, or includes aspects of, the first patterned text or the second patterned text described with reference to FIG. 4.

Figure 4:
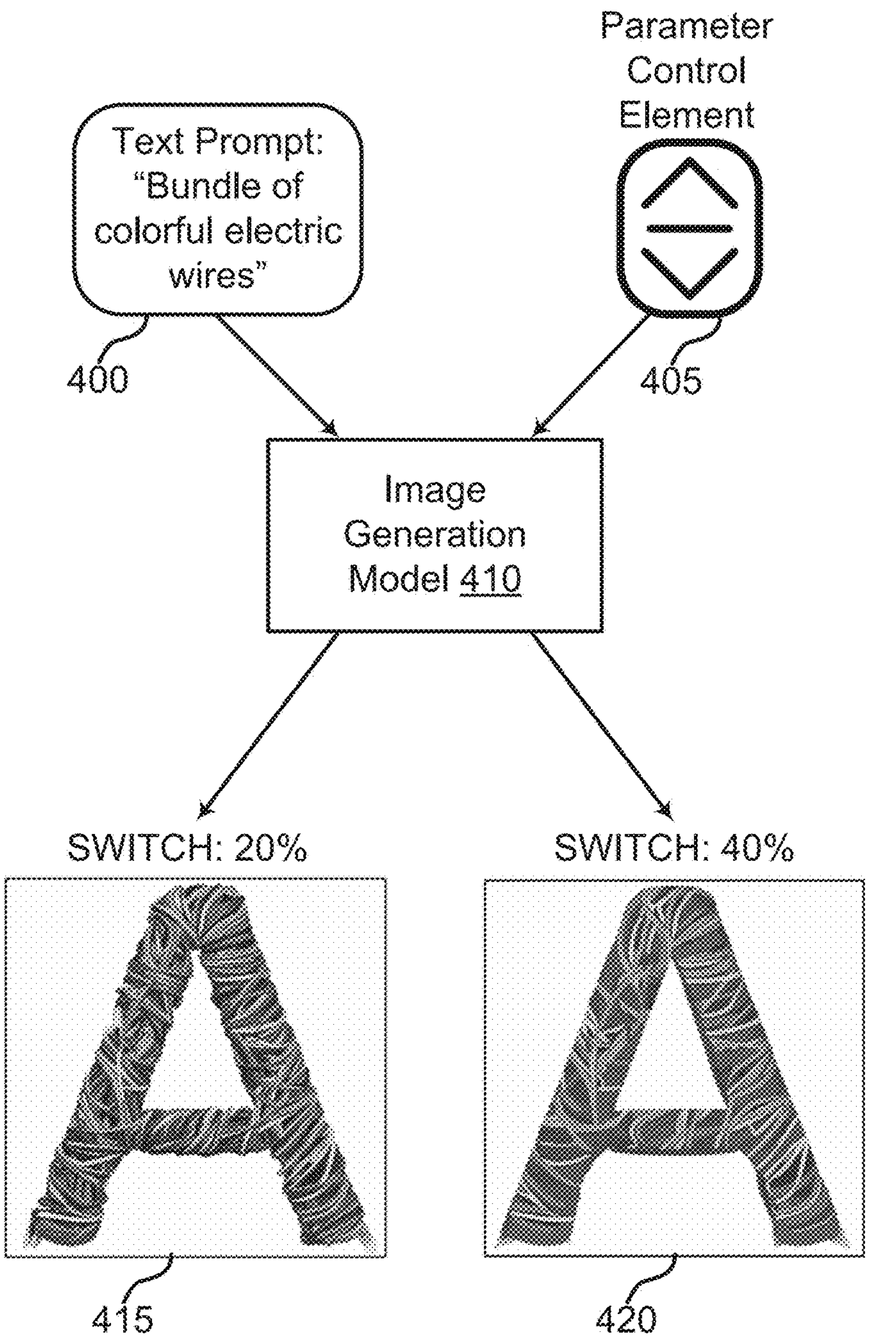
FIG. 4 shows an example of a vector text effect generation with detail control according to aspects of the present disclosure.

FIG. 4 shows an example of a vector text effect generation with detail control according to aspects of the present disclosure. The example shown includes text prompt 400, parameter control element 405, image generation model 410, first patterned text 415, and second patterned text 420.

Referring to FIG. 4, image generation model 410 receives text prompt 400 and a parameter of parameter control element 405 to generate first patterned text 415 and/or second patterned text 420. For example, text prompt 400 provides a general description such as "Bundle of colorful electric wires." Text prompt 400 is used to guide image generation model 410 such that the output (e.g., first patterned text 415 or second patterned text 420) includes an element described by text prompt 400. For example, first patterned text 415 or second patterned text 420 depicts a text character (e.g., A) in electrical wires and in various colors. In some aspects, first patterned text 415 and second patterned text 420 are an example of, or include aspects of, the vectorized patterned text image described with reference to FIGS. 3 and 7.

In some cases, text prompt 400 includes short descriptions or long descriptions. For example, text prompt 400 may include "Peacock feather," "Tiger pattern," "Colorful shaggy fur," "Bread toast," or "Flower lei." In some cases, text prompt 400 may include "Holographic snakeskin with small shiny scales," "Shiny gold liquid golden drip," "Black and gold dripping paint," or "Jungle vine and bird."

According to some embodiments, parameter control element 405 controls the level of detail in the generated output (e.g., first patterned text 415 and second patterned text 420). For example, a user can control parameter control element 405 on a user interface (e.g., the user device described with reference to FIG. 1), parameter control element 405 controls the number of steps in the diffusion process (e.g., reverse diffusion process described with reference to FIG. 8) of image generation model 410. In some cases, the parameter control element 405 controls the input of the image embedding of text prompt 400 (e.g., the image embedding generating using a prior model described with reference to FIG. 7) or the text embedding of text prompt 400 in the diffusion process.

According to some aspects, the more diffusion is guided by the image embedding, the closer the output becomes to a vectorized image. In some cases, when the diffusion process of image generation model 410 is guided more by the image embedding of text prompt 400, a high switch value is obtained. For example, when the switch value is adjusted to 20%, first patterned text 415 depicts more details. For example, when the switch value is adjusted to 40%, second patterned text 420 depicts fewer details. In some cases, a high switch value indicates the output image (or patterned text) becomes simple and abstract.

Text prompt 400 is an example of, or includes aspects of, the corresponding element described with reference to FIGS. 3, 7, and 8. Image generation model 410 is an example of, or includes aspects of, the corresponding element described with reference to FIGS. 3, 6, 7, and 14. First patterned text 415 and second patterned text 420 are examples of, or include aspects of, the vectorized patterned text image described with reference to FIGS. 3 and 7.

Figure 5:
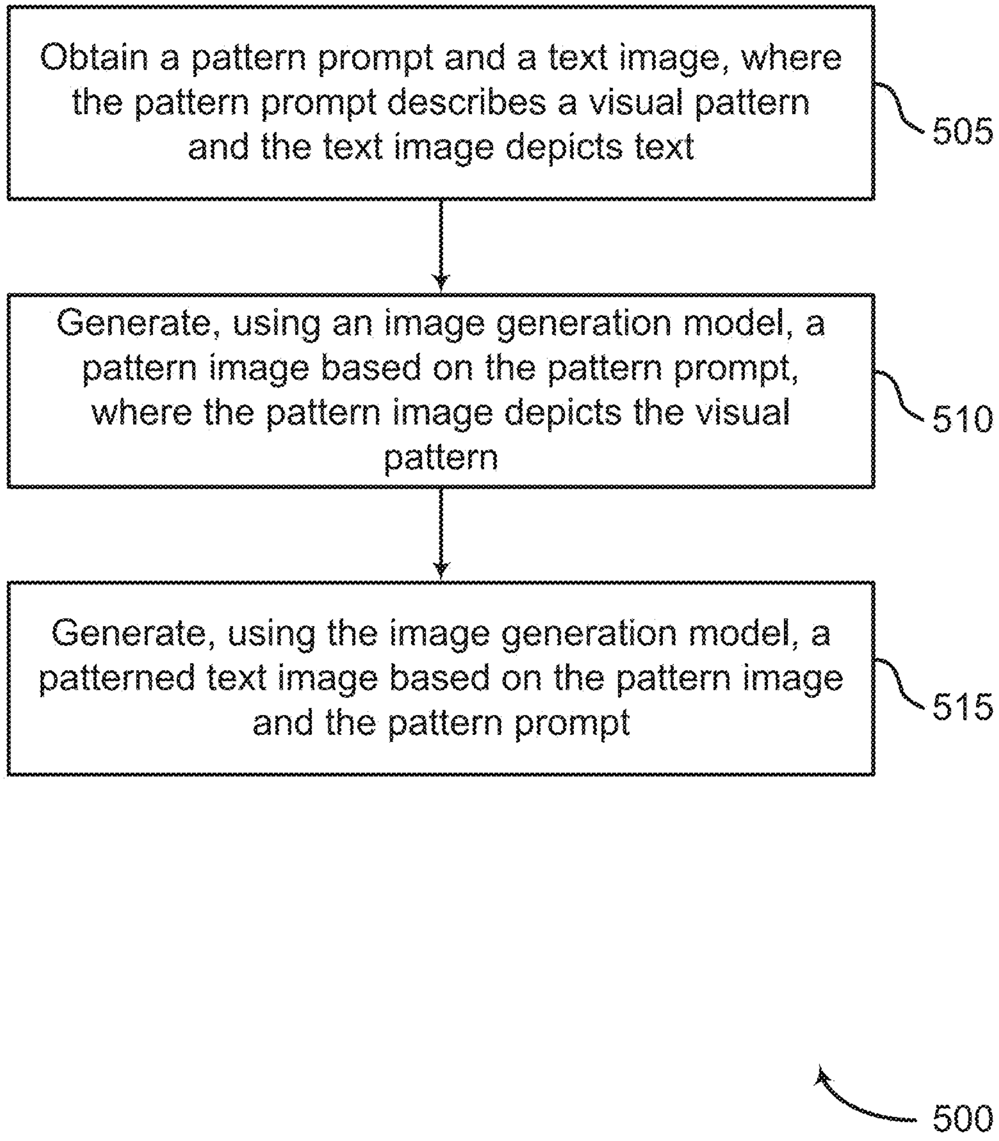
FIG. 5 shows an example of a method for generating a patterned text image according to aspects of the present disclosure.

FIG. 5 shows an example of a method 500 for generating a patterned text image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains a pattern prompt and a text image, where the pattern prompt describes a visual pattern and the text image depicts text. In some cases, the operations of this step refer to, or may be performed by, an image generation model as described with reference to FIGS. 3, 4, 6, 7, and 14. For example, the pattern prompt includes a text description describing a pattern, a texture, or a general description. In some cases, a plurality of text characters are obtained to generate the text image. For example, each of the plurality of text characters is arranged in the text image such that a background region of the text image is minimized. Further detail on the text image (or text image mask) is described with reference to FIG. 7.

In some cases, the pattern prompt refers to a text or verbal description of a pattern. In some cases, a pattern prompt provides details, characteristics, and information about a particular pattern. For example, a pattern prompt that states "Tiger pattern" provides information that the pattern is related to a tiger, tiger skin, or features of a tiger.

In some cases, a pattern refers to repetitive arrangements of visual elements. In some cases, a pattern can be characterized by the spatial arrangement, color distribution, or texture within an image (e.g., the pattern image). In some cases, the visual elements include shapes, structures, textures, colors, or objects.

In some cases, a text image refers to an image that includes text. For example, text may include text characters, English alphabets, letters, punctuation marks, glyphs, symbols, words, or sentences. A text image may include one or more text characters arranged in a way defined by the machine learning model.

At operation 510, the system generates, using an image generation model, a pattern image based on the pattern prompt, where the pattern image depicts the visual pattern. In some cases, the operations of this step refer to, or may be performed by, an image generation model as described with reference to FIGS. 3, 4, 6, 7, and 14. For example, the image generation model receives a conditioning embedding pair based on the text prompt to generate the pattern image. In some aspects, the image generation model is trained to generate a pattern image based on a pattern prompt. Further detail on generating the pattern image based on the conditioning embedding pair is described with reference to FIG. 7.

In some cases, an embedding refers to a numerical representation of words, sentences, documents, or images in a vector space. The embedding is used to encode semantic meaning, relationships, and context of the words, sentences, documents, or images where the encoding can be processed by a machine learning model. For example, an image embedding captures complex visual features in a high-dimensional vector space. For example, a text embedding includes semantic relationships between words or tokens in a low-dimensional vector space.

At operation 515, the system generates, using the image generation model, a patterned text image based on the pattern image and the pattern prompt. In some cases, the operations of this step refer to, or may be performed by, an image generation model as described with reference to FIGS. 3, 4, 6, 7, and 14. In some cases, the image generation model generates the patterned text image based on the pattern image, the conditioning embedding pair of the pattern prompt, and the text image. For example, the patterned text image includes text from the text image and a pattern described by the pattern prompt. In some embodiments, the patterned text image is further used in a post-processing step to generate a vectorized patterned text image. Further detail on patterned text image is described with reference to FIG. 7. Further detail on vectorized patterned text image is described with reference to FIG. 7.

Image Processing Architecture

In FIGS. 1, 6-8, and 16, an apparatus and system for image processing are described. One or more aspects of the apparatus and system include at least one processor and at least one memory storing instructions executable by the at least one processor. One or more aspects of the apparatus and system further include an image generation model comprising parameters stored in the at least one memory and trained to generate a pattern image based on a pattern prompt, where the pattern image depicts a visual pattern, and trained to generate a patterned text image based on the pattern image and the pattern prompt.

In some aspects, the image generation model comprises a first image generation model configured to generate the pattern image, and a second image generation model configured to generate the patterned text image. In some examples, the first image generation mode and the second image generation model are the same image generation model.

Some examples of the apparatus and system further include a prior model trained to generate a conditioning embedding for the image generation model. Some examples of the apparatus and system further include an upsampling model trained to upscale the patterned text image to obtain an upscaled patterned text image. Some examples of the apparatus and system further include a vectorization component configured to generate a vectorized patterned text image based on the patterned text image.

Figure 6:
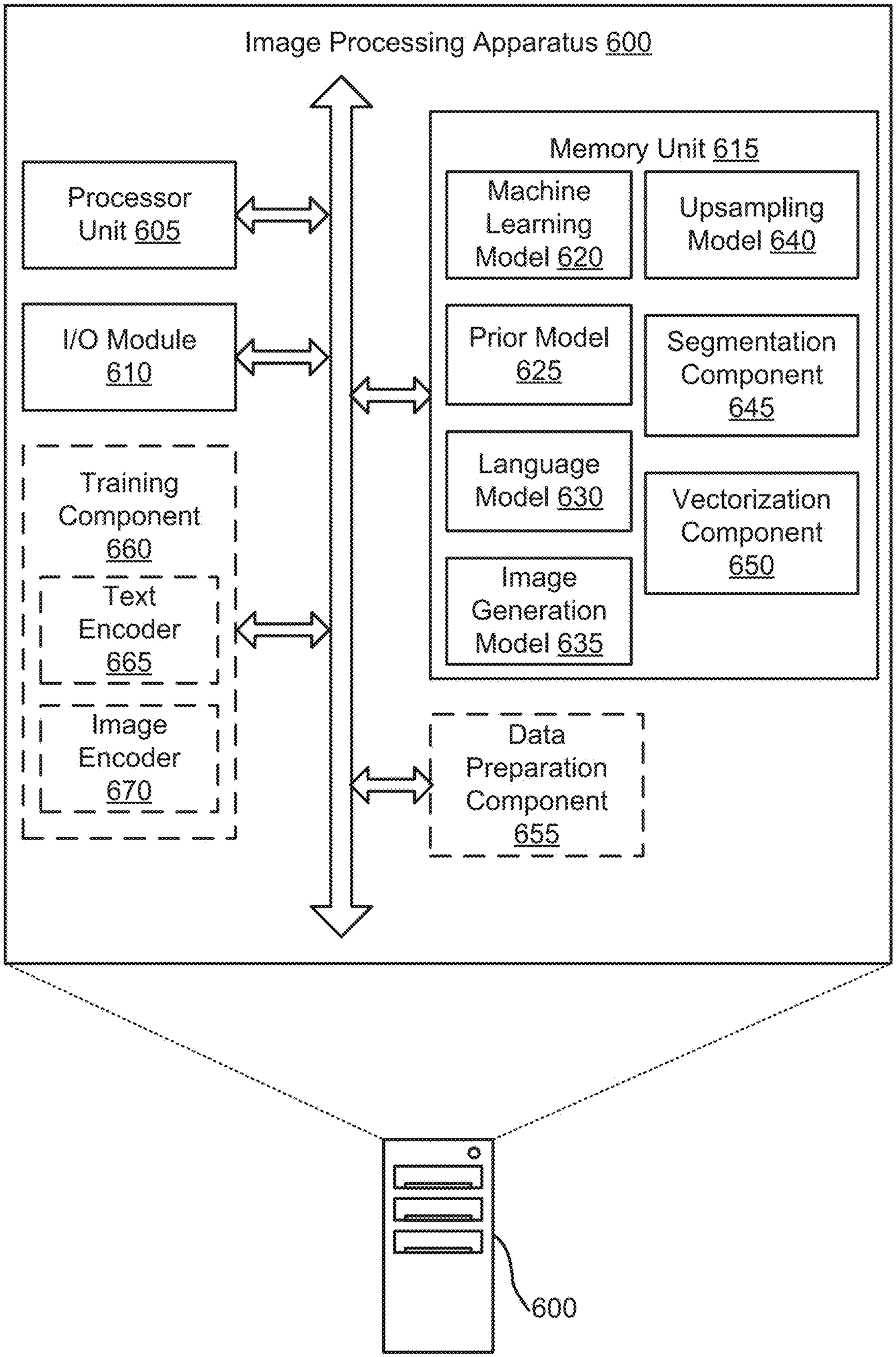
FIG. 6 shows an example of an image processing apparatus according to aspects of the present disclosure.

FIG. 6 shows an example of an image processing apparatus 600 according to aspects of the present disclosure. The example shown includes image processing apparatus 600, processor unit 605, I/O module 610, memory unit 615, data preparation component 655, and training component 660. In one aspect, memory unit 615 includes machine learning model 620, prior model 625, language model 630, image generation model 635, upsampling model 640, segmentation component 645, and vectorization component 650. In one aspect, training component 660 includes text encoder 665 and image encoder 670.

According to some embodiments of the present disclosure, image processing apparatus 600 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted. Image processing apparatus 600 is an example of, or includes aspects of, the corresponding element described with reference to FIG. 1.

Processor unit 605 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into the processor. In some cases, processor unit 605 is configured to execute computer-readable instructions stored in a memory to perform various functions. In some embodiments, processor unit 605 includes special-purpose components for modem processing, baseband processing, digital signal processing, or transmission processing. Processor unit 605 is an example of, or includes aspects of, the processor described with reference to FIG. 16.

I/O module 610 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 610 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna. The user interface is an example of, or includes aspects of, the corresponding element described with reference to FIGS. 1 and 16.

Examples of memory unit 615 include random access memory (RAM), read-only memory (ROM), or a hard disk. Examples of memory unit 615 include solid-state memory and a hard disk drive. In some examples, memory unit 615 is used to store computer-readable, computer-executable software including instructions that, when executed, cause a processor to perform various functions described herein.

In some cases, memory unit 615 includes, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 615 store information in the form of a logical state.

In one aspect, memory unit 615 includes machine learning model 620, prior model 625, language model 630, image generation model 635, upsampling model 640, segmentation component 645, and vectorization component 650. Memory unit 615 is an example of, or includes aspects of, the memory subsystem described with reference to FIG. 16.

In one aspect, machine learning model 620 includes prior model 625, language model 630, image generation model 635, upsampling model 640, segmentation component 645, and vectorization component 650. In some cases, machine learning model 620 is a computational algorithm, model, or system designed to recognize patterns, make predictions, or perform a specific task (for example, image processing) without being explicitly programmed.

According to some embodiments of the present disclosure, machine learning model 620 includes an ANN, which is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, machine learning model 620 includes a computer-implemented convolutional neural network (CNN). CNN is a class of neural networks commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

In one aspect, machine learning model 620 includes machine learning parameters. Machine learning parameters, also known as model parameters or weights, are variables that provide a behavior and characteristics of machine learning model 620. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that allow machine learning model 620 to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

According to some embodiments, machine learning model 620 includes a computer-implemented recurrent neural network (RNN). An RNN is a class of ANN in which connections between nodes form a directed graph along an ordered (e.g., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

According to some embodiments, machine learning model 620 includes a transformer (or a transformer model, or a transformer network), where the transformer is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give each word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism (e.g., implemented in one or more ANNs) is a method of placing differing levels of importance on different elements of an input. Calculating attention may involve three basic steps. First, a similarity between the query and key vectors obtained from the input is computed to generate attention weights. Similarity functions used for this process can include the dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

An attention mechanism is a key component in some ANN architectures, particularly ANNs employed in natural language processing (NLP) and sequence-to-sequence tasks, that allows an ANN to focus on different parts of an input sequence when making predictions or generating output.

Some sequence models (such as RNNs) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

The term "self-attention" refers to a machine learning model in which representations of the input interact with each other to determine attention weights for the input. Self-attention can be distinguished from other attention models because the attention weights are determined at least in part by the input itself.

According to some aspects, machine learning model 620 combines the pattern image and the text image to obtain a preliminary patterned text image, where the patterned text image is generated based on the preliminary patterned text image. In some examples, machine learning model 620 arranges a set of characters of the text to minimize a background region of the text image. Machine learning model 620 is an example of, or includes aspects of, the corresponding element described with reference to FIG. 7.

According to some aspects, prior model 625 is implemented as software stored in memory unit 615 and executable by processor unit 605, as firmware, as one or more hardware circuits, or as a combination thereof. According to some aspects, prior model 625 generates a positive conditioning embedding based on the pattern prompt. According to some aspects, prior model 625 generates a first embedding based on the text encoding. According to some aspects, prior model 625 is trained to generate a conditioning embedding for the image generation model 635. Prior model 625 is an example of, or includes aspects of, the corresponding element described with reference to FIGS. 7 and 13.

According to some aspects, language model 630 includes natural language processing (NLP). NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models that make soft, probabilistic decisions based on attaching real-valued weights to input features. In some cases, these models express the relative probability of multiple answers.

According to some aspects, language model 630 is implemented as software stored in memory unit 615 and executable by processor unit 605, as firmware, as one or more hardware circuits, or as a combination thereof. According to some aspects, language model 630 generates a negative conditioning embedding based on a negative prompt, where the image generation model 635 generates the pattern image based on the positive conditioning embedding and the negative conditioning embedding. Language model 630 is an example of, or includes aspects of, the corresponding element described with reference to FIG. 7.

According to some aspects, image generation model 635 is implemented as software stored in memory unit 615 and executable by processor unit 605, as firmware, as one or more hardware circuits, or as a combination thereof. According to some aspects, image generation model 635 obtains a pattern prompt and a text image, where the pattern prompt describes a visual pattern and the text image depicts text. In some examples, image generation model 635 generates a pattern image based on the pattern prompt, where the pattern image depicts the visual pattern.

According to some aspects, image generation model 635 generates a patterned text image based on the pattern image and the pattern prompt. In some aspects, the image generation model 635 generates the patterned text image based on the positive conditioning embedding and the negative conditioning embedding. In some aspects, the image generation model 310 is trained to generate text effects.

According to some aspects, image generation model 635 comprises parameters stored in the at least one memory and trained to generate a pattern image based on a pattern prompt, where the pattern image depicts a visual pattern, and trained to generate a patterned text image based on the pattern image and the pattern prompt. In some aspects, the image generation model 635 includes a first image generation model configured to generate the pattern image, and a second image generation model configured to generate the patterned text image 315. In some embodiments, the first image generation model and the second image generation model are the same generative models. In some embodiments, the first image generation model and the second image generation model are different generative models. Image generation model 635 is an example of, or includes aspects of, the corresponding element described with reference to FIGS. 3, 4, 7, and 14.

According to some aspects, upsampling model 640 is implemented as software stored in memory unit 615 and executable by processor unit 605, as firmware, as one or more hardware circuits, or as a combination thereof. According to some aspects, upsampling model 640 upscales the patterned text image to obtain an upscaled patterned text image, where the vector patterned text image is generated based on the upscaled patterned text image. According to some aspects, upsampling model 640 is trained to upscale the patterned text image to obtain an upscaled patterned text image. Upsampling model 640 is an example of, or includes aspects of, the corresponding element described with reference to FIGS. 7 and 15.

According to some aspects, segmentation component 645 is implemented as software stored in memory unit 615 and executable by processor unit 605, as firmware, as one or more hardware circuits, or as a combination thereof. According to some aspects, segmentation component 645 segments the patterned text image to obtain a set of patterned character images, where the vector patterned text image is generated based on the set of patterned character images. Segmentation component 645 is an example of, or includes aspects of, the corresponding element described with reference to FIG. 7.

According to some aspects, vectorization component 650 is implemented as software stored in memory unit 615 and executable by processor unit 605, as firmware, as one or more hardware circuits, or as a combination thereof. According to some aspects, vectorization component 650 generates a vector patterned text image based on the patterned text image. According to some aspects, vectorization component 650 is configured to generate a vector patterned text image based on the patterned text image. Vectorization component 650 is an example of, or includes aspects of, the corresponding element described with reference to FIGS. 3 and 7.

According to some aspects, data preparation component 655 is implemented as software stored in memory unit 615 and executable by processor unit 605, as firmware, as one or more hardware circuits, or as a combination thereof. According to some aspects, data preparation component 655 filters a set of images to remove images depicting text, where the training set excludes the removed images. In some examples, data preparation component 655 generates an aesthetic score for each of a set of images. In some examples, data preparation component 655 filters the set of images to remove images if the aesthetic score is below a threshold, where the training set excludes the removed images.

According to some embodiments, data preparation component 655 is implemented as software stored in memory unit 615 and executable by a processor in processor unit 605 of a separate computing device, as firmware in the separate computing device, as one or more hardware circuits of the separate computing device, or as a combination thereof. In some examples, data preparation component 655 is part of another apparatus other than image processing apparatus 600 and communicates with the image processing apparatus 600. In some examples, data preparation component 655 is part of image processing apparatus 600.

According to some aspects, training component 660 is implemented as software stored in memory unit 615 and executable by processor unit 605, as firmware, as one or more hardware circuits, or as a combination thereof. In one aspect, training component 660 includes text encoder 665 and image encoder 670. According to some embodiments, training component 660 is implemented as software stored in a memory unit and executable by a processor in the processor unit of a separate computing device, as firmware in the separate computing device, as one or more hardware circuits of the separate computing device, or as a combination thereof. In some examples, training component 660 is part of another apparatus other than image processing apparatus 600 and communicates with the image processing apparatus 600. In some examples, training component 660 is part of image processing apparatus 600.

According to some aspects, training component 660 initializes an image generation model 635. In some examples, training component 660 obtains a training set that includes a ground-truth pattern image and a pattern prompt, where the ground-truth pattern image depicts a visual pattern and the pattern prompt describes the visual pattern. In some examples, training component 660 trains, using the training set, the image generation model 635 to generate patterned text images.

In some examples, training component 660 computes a diffusion loss. In some examples, training component 660 updates the parameters of the image generation model 635 based on the diffusion loss. In some examples, training component 660 trains the prior model 625 based on the first embedding and the second embedding. In some examples, training component 660 trains an upsampling model 640 using a generative adversarial loss.

According to some aspects, text encoder 665 is implemented as software stored in memory unit 615 and executable by processor unit 605, as firmware, as one or more hardware circuits, or as a combination thereof. In some examples, text encoder 665 is part of another apparatus other than image processing apparatus 600 and communicates with the image processing apparatus 600. In some examples, text encoder 665 is part of image processing apparatus 600. According to some aspects, text encoder 665 generates a text encoding based on the pattern prompt. Text encoder 665 is an example of, or includes aspects of, the corresponding element described with reference to FIGS. 8 and 13.

According to some aspects, image encoder 670 is implemented as software stored in memory unit 615 and executable by processor unit 605, as firmware, as one or more hardware circuits, or as a combination thereof. In some examples, image encoder 670 is part of another apparatus other than image processing apparatus 600 and communicates with the image processing apparatus 600. In some examples, image encoder 670 is part of image processing apparatus 600. According to some aspects, image encoder 670 generates a second embedding based on the ground-truth pattern image. Image encoder 670 is an example of, or includes aspects of, the corresponding element described with reference to FIGS. 8 and 13.

Figure 7:
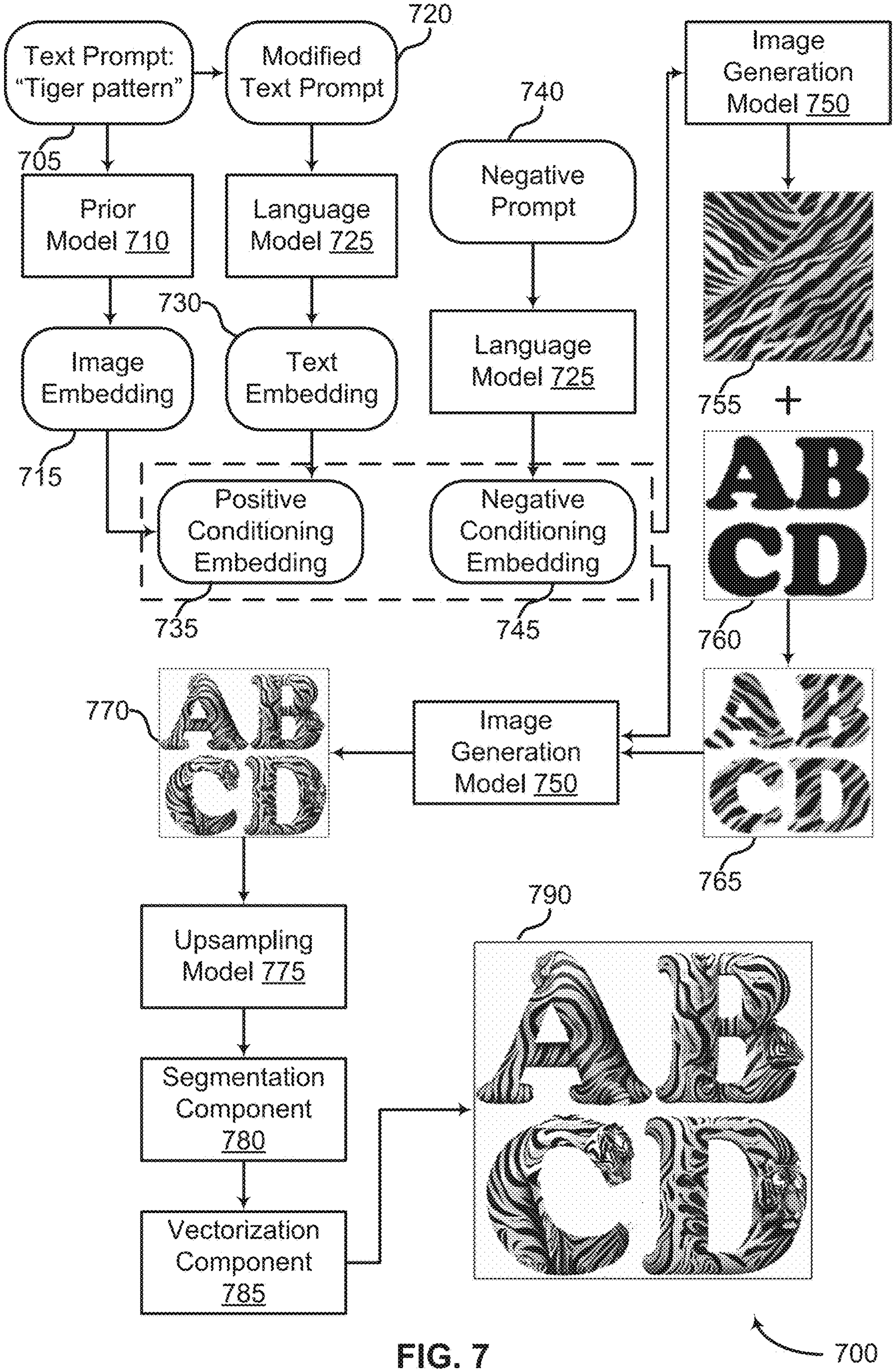
FIG. 7 shows an example of a machine learning model according to aspects of the present disclosure.

FIG. 7 shows an example of a machine learning model 700 according to aspects of the present disclosure. The example shown includes machine learning model 700, text prompt 705, prior model 710, image embedding 715, modified text prompt 720, language model 725, text embedding 730, positive conditioning embedding 735, negative prompt 740, negative conditioning embedding 745, image generation model 750, pattern image 755, text image mask 760, preliminary patterned text image 765, patterned text image 770, upsampling model 775, segmentation component 780, vectorization component 785, and vectorized patterned text image 790.

Referring to FIG. 7, for example, a user provides text prompt 705 to machine learning model 700 to generate vectorized patterned text image 790. In some embodiments, prior model 710 receives text prompt 705. For example, text prompt 705 is a text description that describes a pattern such as "Tiger pattern." Prior model 710 generates image embedding 715 based on text prompt 705. In some cases, prior model 710 converts a text embedding of text prompt 705 into image embedding 715. For example, a text embedding of text prompt 705 includes semantic information and textual information of, for example, "Tiger pattern" in a vector. Image embedding 715 includes visual information and extracted features of an image that depicts, for example, "Tiger pattern." In some cases, for example, image embedding 715 is used as a style embedding for image generation model 750. In some embodiments, prior model 710 is trained to convert text embedding of text prompt 705 to image embedding 715. Further detail on training prior model 710 is described with reference to FIGS. 12 and 13.

According to some embodiments, machine learning model 700 modifies text prompt 705 to generate modified text prompt 720. By using modified text prompt 720, an image generation model (e.g., image generation model 750) can generate an output image (e.g., pattern image 755) that depicts a pattern or a texture. In some cases, the output image is vectorizable because of the visual features. In some cases, for example, modified text prompt 720 is obtained using the following equation:

$$\text{modified prompt} = \text{prompt} + \text{“pattern, texture, repeated, tiled”} \quad (1)$$

Accordingly, by using modified text prompt 720 to generate the output image (e.g., pattern image 755), the image detail of the output image is increased, output diversity is augmented (e.g., generating multiple images having varied styles based on one input prompt), and image coherence is increased (e.g., having a consistent pattern or uniform tone). In some aspects, the probability of image generation model 750 to generate contextually relevant images aligned with the input prompt (e.g., text prompt 705) is increased. In some aspects, by using modified text prompt 720, image generation model 750 can be prevented from generating images having harmful, inappropriate, or unwanted features. Accordingly, the performance of image generation model 750 is improved.

According to some embodiments, language model 725 receives modified text prompt 720 and generates text embedding 730. For example, language model 725 is a FLAN T5 XL model. However, embodiments of the present disclosure are not necessarily limited herein. In some cases, for example, other suitable language models, such as BERT, GPT, Elmo, XLNet, RoBERTa, DistilBERT, ALBERT, or ERNIE can be used to generate text embedding 730. According to some embodiments, text embedding 730 and image embedding 715 are combined to generate positive conditioning embedding. In some cases, for example, text embedding 730 and image embedding 715 are concatenated.

Concatenation refers to a mathematical or machine learning operation that combines two or more data structures (e.g., feature vectors, sequences, or tensors) along a particular dimension. In some cases, features from different representations can be concatenated to create a combined feature vector. For example, combining features (e.g., image embedding 715) extracted from an image (or text prompt 705) and features (e.g., text embedding 730) extracted from a text (e.g., modified text prompt 720) to generate a combined feature vector (e.g., positive conditioning embedding 735) for a model (e.g., image generation model 750).

According to some embodiments, negative prompt 740 is used to generate negative conditioning embedding 745. In some cases, negative prompt 740 includes a pre-determined text prompt. For example, negative prompt 740 includes "photo-realistic, realism, high-detailed, gradient." In an embodiment, language model 725 receives negative prompt 740 and generates a text embedding. The text embedding is used as negative conditioning embedding 745.

According to some embodiments, the conditioning embedding pair that includes positive conditioning embedding 735 and negative conditioning embedding 745 is used as input to image generation model 750 to generate pattern image 755. For example, the conditioning embedding pair is used as guidance features in the cross-attention layer (or cross-attention block described with reference to FIG. 8) of image generation model 750. In some embodiments, image embedding 715 is used in a final neural network layer of a U-Net decoder of image generation model 750. As a result, pattern image 755 depicts an increased distinction between content and style.

According to some embodiments, a user provides a text to machine learning model 700. For example, the text includes one or more text characters, glyphs, notations, punctuations, marks, shapes, etc. In some cases, machine learning model 700 provides the text including, for example, the English alphabet. Machine learning model 700 arranges each of the text characters onto a text image to generate text image mask 760. In some cases, machine learning model 700 minimizes a background region (e.g., empty space) of text image mask 760. For example, each of the text characters can be arranged using the following equation:

$$\max_{\varphi}\left(\sum_{i=0}^{N}\sum_{j=0}^{N}\frac{\pi(\varphi)[i, j]}{M[i, j]}\right) \tag{2}$$

where φ represents a permutation of distinct letters from the stylization text, M[i, j] represents the pixels at the position (i, j), π(•) is a function that receives parameters of a permutation of letters, and M represents mask including the permutation of letters. For example, text image mask 760 depicts the arranged text including text characters or letters of "A B C D," and a permutation φ can be $$\varphi = \begin{pmatrix} A & B & C & D \\ (1, 1) & (1, 2) & (2, 1) & (2, 2) \end{pmatrix},$$

where the coordinate (x, y) represents (row, column), respectively.

According to an embodiment, mask M (or text image mask 760) is obtained by applying a Gaussian filter of different intensities over the text image. In one aspect, the Gaussian filter increase the degree of detail on edges of each of the text characters. As a result, text image mask 760 can be used as a permissive conditioning to image generation model 750, resulting in a more creative output image. For example, to further increase the level of detail, machine learning model 700 randomly selects points on the outline of each of the text characters. Then, the noise blob distribution of different diameters is applied to these points. By distorting the mask M with this type of noise, the degree of creativity of the output image (e.g., patterned text image) can be increased. For example, the tiger heads in patterned text image 770 or vectorized patterned text image 790 are the results of the noise blob distortion.

According to some embodiments, noise blob distribution is added to text image mask 760 to generate a distorted text image mask, where patterned text image 770 is generated based on the distorted text image mask. In some embodiments, machine learning model 700 combines pattern image 755 and text image mask 760 to generate preliminary patterned text image 765. For example, preliminary patterned text image 765 represents pixeled regions of text image mask having patterns depicted in pattern image 755. In some embodiments, preliminary patterned text image 765 is generated based on the distorted text image mask.

In some embodiments, image generation model 750 receives preliminary patterned text image 765 and the conditioning embedding pair to generate patterned text image 770. Compared to preliminary patterned text image 765, patterned text image 770 depicts a more realistic pattern described by text prompt 705 (e.g., "Tiger skin"). Furthermore, patterned text image 770 includes one or more tiger heads on the edges of each of the text characters. In some cases, patterned text image 770 is a low-resolution image.

In some embodiments, image generation model 750 includes a first image generation model and a second image generation model. For example, the first image generation model is trained and configured to generate pattern image 755 based on text prompt 705. For example, the second image generation model is trained and configured to generate patterned text image 770 based on pattern image 755. In some embodiments, the first image generation model and the second image generation model are the same image generation model.

According to some embodiments, patterned text image 770 is used in a post-processing stage to generate vectorized patterned text image 790. For example, during the post-processing stage, upsampling model 775, segmentation component 780, and/or vectorization component 785 are used. In one embodiment, upsampling model 775 upscales patterned text image 770 to generate an upscaled patterned text image. Compared to patterned text image 770, the upscaled patterned text image is approximately eight times the resolution of the patterned text image. In some aspects, the upscaled patterned text image has clearer edges, quantized gradients in multiple colors, reduced artifact, and improved image quality than patterned text image 770. Accordingly, patterned text image 770 is scalable, using upsampling model 775, without compromising the image quality.

In one embodiment, segmentation component 780 segments (or divides) patterned text image 770 (or the upscaled patterned text image) into a set of patterned character images, where each of the patterned character images includes a text character. In some aspects, segmentation component 780 removes artifacts (if any) generated by the image generation model 750.

In one embodiment, vectorization component 785 receives the set of patterned character images to generate vectorized patterned text image 790. In some cases, vectorization component 785 transforms raster images (or pixel images) into vector images. For example, image generation model 750 may generate patterned text image 770 as a pixel image. By using vectorization component 785, patterned text image 770 is converted into vectorized patterned text image 790.

Machine learning model 700 is an example of, or includes aspects of, the corresponding element described with reference to FIG. 6. Text prompt 705 is an example of, or includes aspects of, the corresponding element described with reference to FIGS. 3, 4, and 8. Prior model 710 is an example of, or includes aspects of, the corresponding element described with reference to FIGS. 6 and 13.

Language model 725 is an example of, or includes aspects of, the corresponding element described with reference to FIG. 6. Text embedding 730 is an example of, or includes aspects of, the corresponding element described with reference to FIG. 13. Image generation model 750 is an example of, or includes aspects of, the corresponding element described with reference to FIGS. 3, 4, 6, and 14. Patterned text image 770 is an example of, or includes aspects of, the corresponding element described with reference to FIG. 3.

Upsampling model 775 is an example of, or includes aspects of, the corresponding element described with reference to FIGS. 6 and 15. Segmentation component 780 is an example of, or includes aspects of, the corresponding element described with reference to FIG. 6. Vectorization component 785 is an example of, or includes aspects of, the corresponding element described with reference to FIGS. 3 and 6. Vectorized patterned text image 790 is an example of, or includes aspects of, the corresponding element described with reference to FIG. 3.

Figure 8:
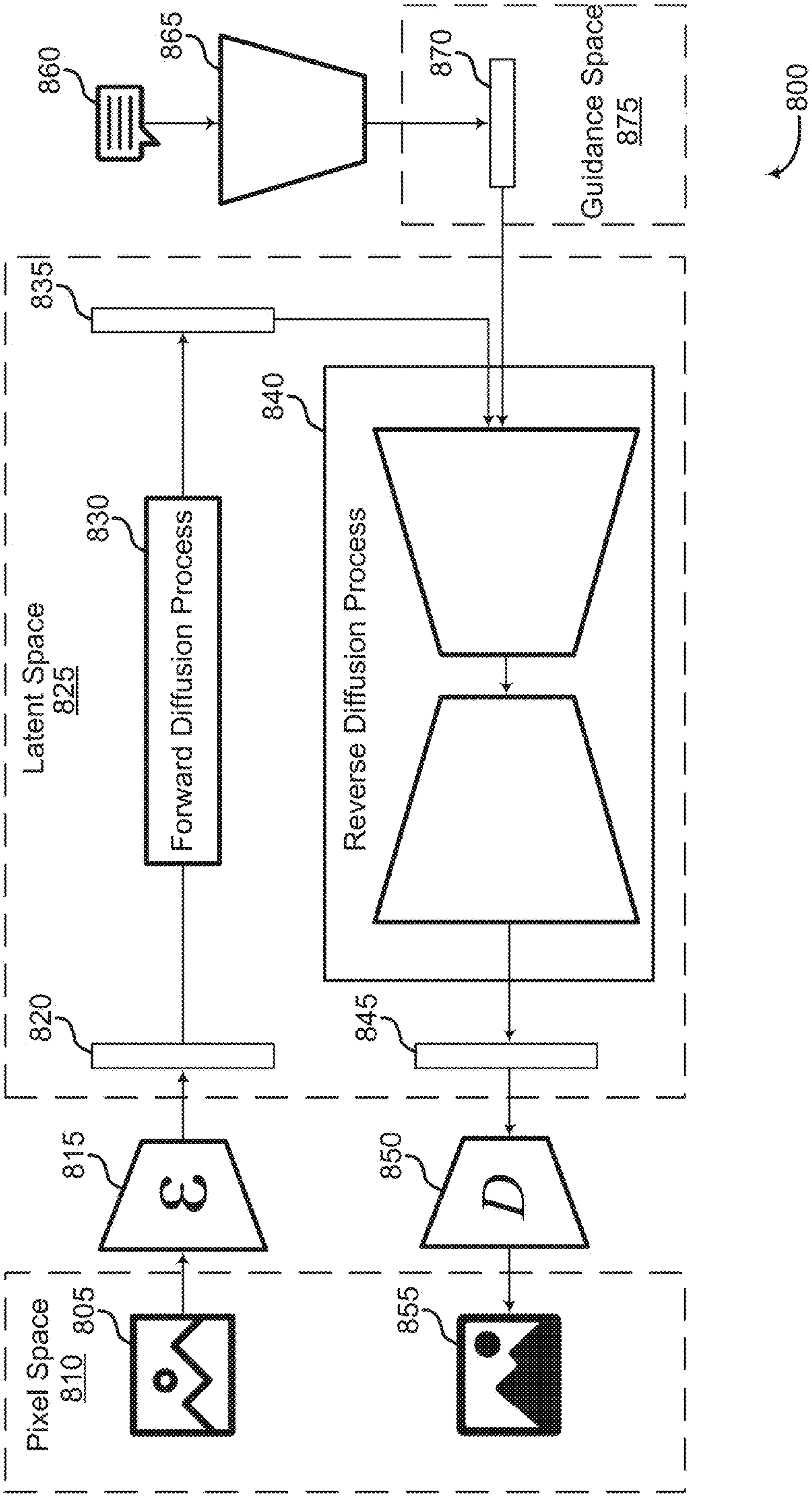
FIG. 8 shows an example of a diffusion model according to aspects of the present disclosure.

FIG. 8 shows an example of a diffusion model 800 according to aspects of the present disclosure. The example shown includes diffusion model 800, original image 805, pixel space 810, image encoder 815, original image feature 820, latent space 825, forward diffusion process 830, noisy feature 835, reverse diffusion process 840, denoised image features 845, image decoder 850, output image 855, text prompt 860, text encoder 865, guidance feature 870, and guidance space 875.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Diffusion models work by iteratively adding noise to the data during a forward process and then learning to recover the data by denoising the data during a reverse process. For example, during training, diffusion model 800 may take an original image 805 in a pixel space 810 as input and apply an image encoder 815 to convert original image 805 into original image features 820 in a latent space 825. Then, a forward diffusion process 830 gradually adds noise to the original image features 820 to obtain noisy features 835 (also in latent space 825) at various noise levels.

Next, a reverse diffusion process 840 (e.g., a U-Net ANN) gradually removes the noise from the noisy features 835 at the various noise levels to obtain the denoised image features 845 in latent space 825. In some examples, denoised image features 845 are compared to the original image features 820 at each of the various noise levels, and parameters of the reverse diffusion process 840 of the diffusion model are updated based on the comparison. Finally, an image decoder 850 decodes the denoised image features 845 to obtain an output image 855 in pixel space 810. In some cases, an output image 855 is created at each of the various noise levels. The output image 855 can be compared to the original image 805 to train the reverse diffusion process 840. In some cases, output image 855 refers to the patterned text image (e.g., described with reference to FIGS. 3 and 7).

In some cases, image encoder 815 and image decoder 850 are pre-trained prior to training the reverse diffusion process 840. In some examples, image encoder 815 and image decoder 850 are trained jointly, or the image encoder 815 and image decoder 850 are fine-tuned jointly with the reverse diffusion process 840.

The reverse diffusion process 840 can also be guided based on a text prompt 860, or another guidance prompt, such as an image, a layout, a style, a color, a segmentation map, etc. The text prompt 860 can be encoded using a text encoder 865 (e.g., a multimodal encoder) to obtain guidance features 870 in guidance space 875. The guidance features 870 can be combined with the noisy features 835 at one or more layers of the reverse diffusion process 840 to ensure that the output image 855 includes content described by the text prompt 860. For example, guidance feature 870 can be combined with the noisy feature 835 using a cross-attention block within the reverse diffusion process 840. In some cases, text prompt 860 refers to the corresponding element described with reference to FIGS. 3, 4, and 7.

Cross-attention, also known as multi-head attention, is an extension of the attention mechanism used in some ANNs, for example, for NLP tasks. In some cases, cross-attention attends to multiple parts of an input sequence simultaneously, capturing interactions and dependencies between different elements. In cross-attention, there are two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing the machine learning model to understand the context and generate more accurate and contextually relevant outputs.

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using the up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 860) describing content to be included in a generated image. For example, a user may provide the prompt "Tiger pattern". In some examples, guidance can be provided in a form other than text, such as via an image, a sketch, a color, a style, or a layout. The system converts text prompt 860 (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the diffusion model 800 generates an image based on the noise map and the conditional guidance vector.

A diffusion process can include both a forward diffusion process 830 for adding noise to an image (e.g., original image 805) or features (e.g., original image feature 820) in a latent space 825 and a reverse diffusion process 840 for denoising the images (or features) to obtain a denoised image (e.g., output image 855). The forward diffusion process 830 can be represented as $q(x_t|x_{t-1})$, and the reverse diffusion process 840 can be represented as $p(x_{t-1}|x_t)$. In some cases, the forward diffusion process 830 is used during training to generate images with successively greater noise, and a neural network is trained to perform the reverse diffusion process 840 (e.g., to successively remove the noise).

In an example forward diffusion process 830 for a latent diffusion model (e.g., diffusion model 800), the diffusion model 800 maps an observed variable $x_0$ (either in a pixel space 810 or a latent space 825) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 840. During the reverse diffusion process 840, the diffusion model 800 begins with noisy data $x_T$, such as a noisy image and denoises the data to obtain the $p(x_{t-1}|x_t)$. At each step t−1, the reverse diffusion process 840 takes $x_t$, such as the first intermediate image, and t as input. Here, t represents a step in the sequence of transitions associated with different noise levels, The reverse diffusion process 840 outputs $x_{t-1}$, such as the second intermediate image iteratively until $x_T$ is reverted back to $x_0$, the original image 805. The reverse diffusion process 840 can be represented as:

$$p_\theta(x_{t-1} \mid x_t) := N\left(x_{t-1}; \mu_\theta(x_t, t), \sum\nolimits_\theta (x_t, t)\right). \quad (3)$$

The joint probability of a sequence of samples in the Markov chain can be written as a product of conditionals and the marginal probability:

$$x_T: p_\theta(x_{0:T}) := p(x_T)\prod\nolimits_{t=1}^{T} p_\theta(x_{t-1} \mid x_t), \quad (4)$$

where $p(x_T)=N(x_T; 0, I)$ is the pure noise distribution as the reverse diffusion process 840 takes the outcome of the forward diffusion process 830, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At interference time, observed data $x_0$ in a pixel space can be mapped into a latent space 825 as input and a generated data $\tilde{x}$ is mapped back into the pixel space 810 from the latent space 825 as output. In some examples, $x_0$ represents an original input image with low image quality, latent variables $x_1, \ldots, x_7$ represent noisy images, and % represents the generated image with high image quality.

A diffusion model 800 may be trained using both a forward diffusion process 830 and a reverse diffusion process 840. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process 830 in N stages. In some cases, the forward diffusion process 830 is a fixed process where Gaussian noise is successively added to an image. In latent diffusion models, the Gaussian noise may be successively added to features (e.g., original image features 820) in a latent space 825.

At each stage n, starting with stage N, a reverse diffusion process 840 is used to predict the image or image features at stage n−1. For example, the reverse diffusion process 840 can predict the noise that was added by the forward diffusion process 830, and the predicted noise can be removed from the image to obtain the predicted image. In some cases, an original image 805 is predicted at each stage of the training process.

The training component (e.g., training component described with reference to FIG. 6) compares predicted image (or image features) at stage n−1 to an actual image (or image features), such as the image at stage n−1 or the original input image. For example, given observed data x, the diffusion model 800 may be trained to minimize the variational upper bound of the negative log-likelihood −log $p_\theta(x)$ of the training data. The training component then updates parameters of the diffusion model 800 based on the comparison. For example, parameters of a U-Net may be updated using gradient descent. Time-dependent parameters of the Gaussian transitions can also be learned.

Image encoder 815 is an example of, or includes aspects of, the corresponding element described with reference to FIGS. 6 and 13. Text prompt 860 is an example of, or includes aspects of, the corresponding element described with reference to FIGS. 3, 4, and 7. Text encoder 865 is an example of, or includes aspects of, the corresponding element described with reference to FIGS. 6 and 13.

Figure 9:
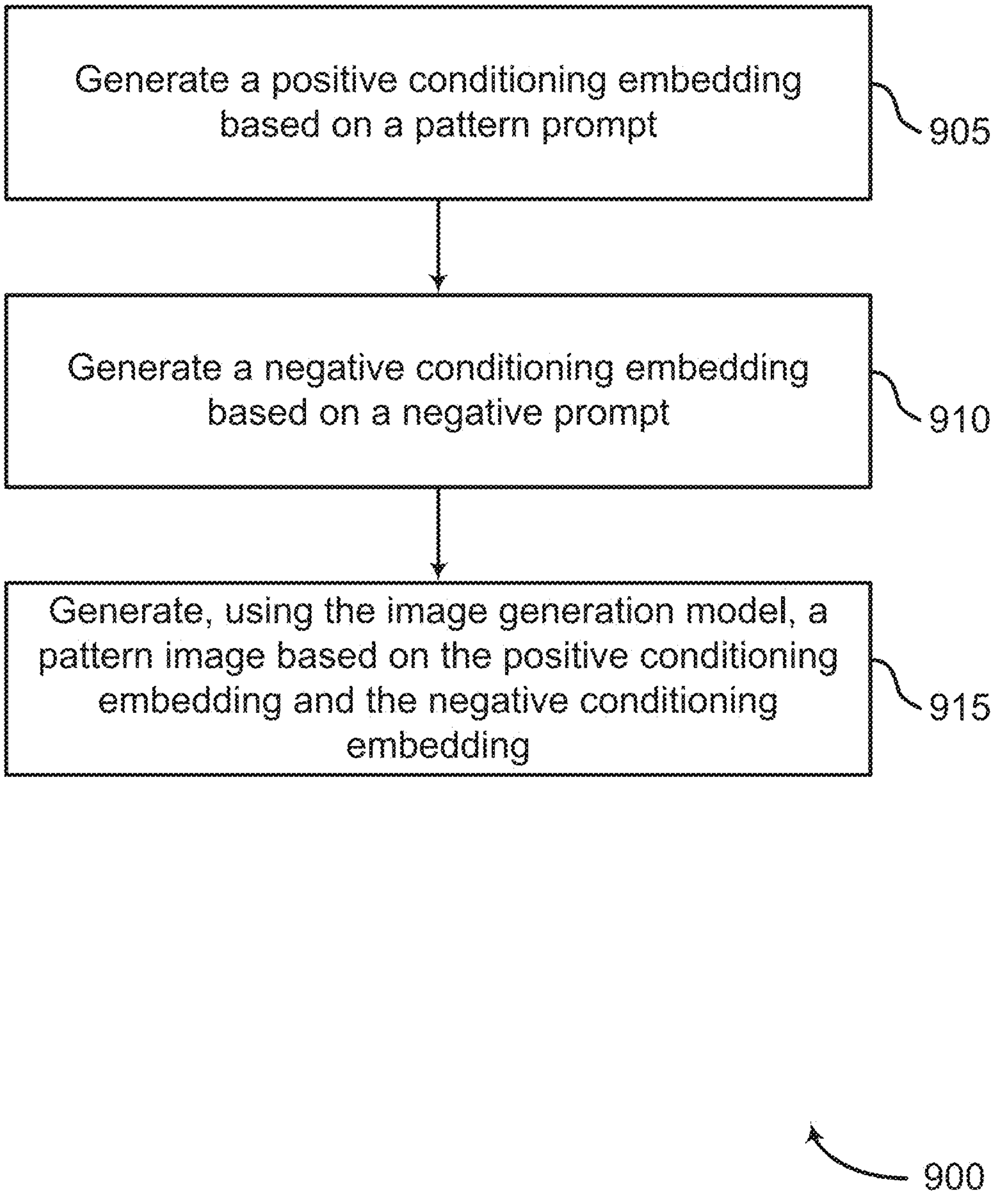
FIG. 9 shows an example of a method for generating conditioning embeddings to the image generation model according to aspects of the present disclosure.

FIG. 9 shows an example of a method 900 for generating conditioning embeddings to the image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, a conditioning embedding pair is generated based on a text prompt input. By conditioning and training the image generation model with the conditioning embedding pair, the image generation model can generate outputs (e.g., pattern image) having consistency such as uniform style, shape, and color. For example, if a text prompt describing "Autumn leaves" is provided to the image generation model, then an output (e.g., the patterned text image) of the image generation model depicts consistency and includes features such as leaves of similar color and shape in all text characters in the patterned text image. On the contrary, if two text characters in the patterned text image include different colors or different shapes of leaves, then the patterned text image is considered to have inconsistency.

At operation 905, the system generates a positive conditioning embedding based on a pattern prompt. In some cases, the operations of this step refer to, or may be performed by, a prior model as described with reference to FIGS. 6, 7, and 13. For example, the prior model receives the text prompt and generates an image embedding based on the text prompt. In one embodiment, a modified text prompt is obtained from the text prompt. For example, the modified text prompt includes an additional prompt "pattern, texture, repeated, tiled." A language model is used to generate a text embedding based on the modified text prompt. In one aspect, the positive conditioning embedding includes the image embedding and the text embedding. In some cases, positive conditioning embedding is used to guide the image generation model to generate an image closely correlated to the positive conditioning embedding.

At operation 910, the system generates a negative conditioning embedding based on a negative prompt. In some cases, the operations of this step refer to, or may be performed by, a language model as described with reference to FIGS. 6 and 7. In some cases, the negative prompt includes a pre-determined text prompt. For example, the negative prompt includes "photo-realistic, realism, high-detailed, gradient." The negative conditioning embedding guides the image generation model to generate an image that negatively correlates and avoids a negative condition. For example, an output image based on the negative prompt might not have features such as photo-realistic, high-detailed, or gradient.

At operation 915, the system generates, using the image generation model, a pattern image based on the positive conditioning embedding and the negative conditioning embedding. In some cases, the operations of this step refer to, or may be performed by, an image generation model as described with reference to FIGS. 3, 4, 6, 7, and 14. In some embodiments, the image generation model is trained to generate a pattern image based on the positive conditioning embedding and the negative conditioning embedding. By training the image generation model with the conditioning embedding pair, the image generation model can learn and generate a pattern image based on a text prompt that includes a pattern, a texture, or a general description. In some aspects, the pattern image includes features such as pattern, texture, repeated, and tiled. In some aspects, the pattern image might not include features such as photo-realistic, high-detailed, or gradient.

Figure 10:
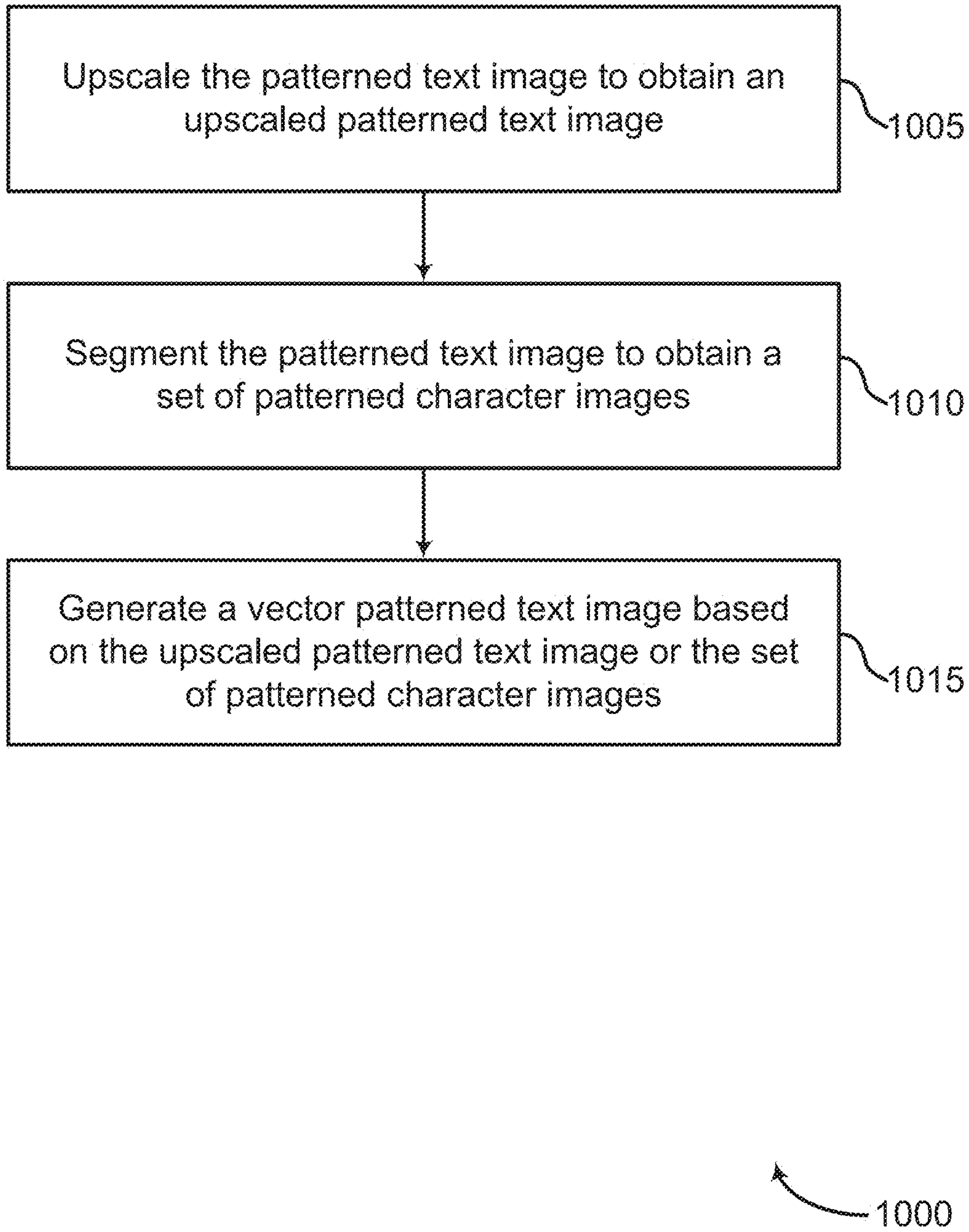
FIG. 10 shows an example of a method for generating scalable vector text effect according to aspects of the present disclosure.

FIG. 10 shows an example of a method 1000 for generating scalable vector text effect according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, a post-processing method is described. In some embodiments, a patterned text image is used to generate a scalable vectorized patterned text image. In some embodiments, the post-processing method uses an upsampling model, a segmentation component, and a vectorization component.

At operation 1005, the system upscales the patterned text image to obtain an upscaled patterned text image. In some cases, the operations of this step refer to, or may be performed by, an upsampling model as described with reference to FIGS. 6, 7, and 15. In some cases, for example, the image generation model generates the patterned text image in low resolution. The upsampling model upscales the patterned text image to generate the upscaled patterned text image. Compared to the patterned text image, the upscaled patterned text image is approximately eight times the resolution of the patterned text image. In some aspects, the upsampling model generates an upscaled patterned text image having clearer edges, quantized gradients in multiple colors, reduced artifacts, and improved image quality. Accordingly, the patterned text image is scalable without compromising the image quality.

At operation 1010, the system segments the patterned text image to obtain a set of patterned character images. In some cases, the operations of this step refer to, or may be performed by, a segmentation component as described with reference to FIGS. 6 and 7. In some cases, the segmentation component includes a semantic segmentation model. The segmentation component segments (or divides) the patterned text image into a set of patterned character images, where each of the patterned character images includes a text character. In some aspects, the segmentation component removes artifacts (if any) generated by the image generation model.

At operation 1015, the system generates a vector patterned text image based on the upscaled patterned text image or the set of patterned character images. In some cases, the operations of this step refer to, or may be performed by, a vectorization component as described with reference to FIGS. 3, 6, and 7. In some cases, for example, the vectorization component transforms raster images (or pixel images) into vector images. For example, the image generation model may generate the patterned text image as a pixel image. By using the vectorization component, a patterned text image is converted into a vectorized patterned text image.

Training and Evaluation

In FIGS. 11-15, a method, apparatus, non-transitory computer readable medium, and system for image processing are described. One or more aspects of the method, apparatus, non-transitory computer readable medium, and system include initializing an image generation model and obtaining a training set that includes a ground-truth pattern image and a pattern prompt, where the ground-truth pattern image depicts a visual pattern and the pattern prompt describes the visual pattern. One or more aspects further include training, using the training set, the image generation model to generate patterned text images.

Some examples of the method, apparatus, non-transitory computer readable medium, and system further include filtering a set of images to remove images depicting text, where the training set excludes the removed images. Some examples of the method, apparatus, non-transitory computer readable medium, and system further include generating an aesthetic score for each of a set of images. Some examples further include filtering the set of images to remove images if the aesthetic score is below a threshold, wherein the training set excludes the removed images.

Some examples of the method, apparatus, non-transitory computer readable medium, and system further include computing a diffusion loss. Some examples further include updating parameters of the image generation model based on the diffusion loss. Some examples of the method, apparatus, non-transitory computer readable medium, and system further include training an upsampling model using a generative adversarial loss.

Some examples of the method, apparatus, non-transitory computer readable medium, and system further include generating, using a text encoder, a text encoding based on the pattern prompt. Some examples further include generating, using a prior model, a first embedding based on the text encoding. Some examples further include generating, using an image encoder, a second embedding based on the ground-truth pattern image. Some examples further include training the prior model based on the first embedding and the second embedding.

Figure 11:
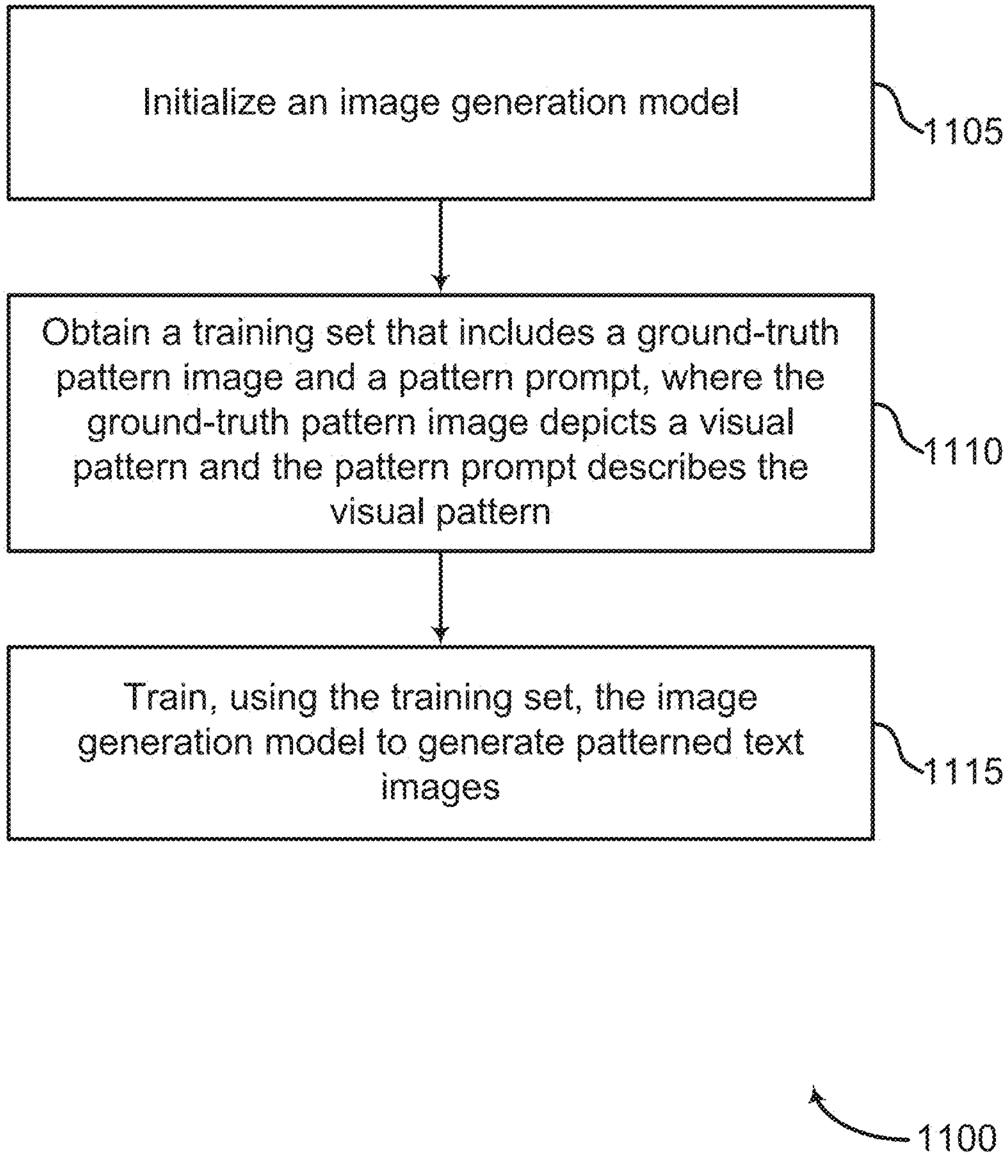
FIG. 11 shows an example of a method for training an image generation model according to aspects of the present disclosure.

FIG. 11 shows an example of a method 1100 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system initializes an image generation model. In some cases, the operations of this step refer to, or may be performed by, a training component as described with reference to FIG. 6. For example, initialization of the image generation model includes defining the architecture of the image generation model and establishing initial values for the model parameters. In some cases, the initialization includes defining hyper-parameters such as the number of layers, the resolution and channels of each layer block, the location of skip connections, training batch size, and the like. In some embodiments, initializing the model includes initializing parameters of the model based on a pre-trained base model. In other embodiments, the parameters are initialized randomly.

At operation 1110, the system obtains a training set that includes a ground-truth pattern image and a pattern prompt, where the ground-truth pattern image depicts a visual pattern and the pattern prompt describes the visual pattern. In some cases, the operations of this step refer to, or may be performed by, a training component as described with reference to FIG. 6. In some cases, the operations of this step refer to, or may be performed by, a data preparation component as described with reference to FIG. 6. In some cases, obtaining a training set includes creating the training set from a pre-existing set of training data (sometimes referred to as a preliminary training dataset) for training the machine learning model. In other examples, a new training set is generated.

According to some embodiments, the data preparation component generates the training set (or training dataset) based on an original dataset. In one embodiment, the data preparation component removes images that include text from a preliminary training dataset (for example, collected from Adobe® Stock) to generate the training dataset. In one embodiment, the data preparation component filters and removes images that have an aesthetic score below a threshold score to generate the training dataset. By generating the training dataset from the preliminary training dataset, errors and artifacts in the training images can be minimized. Additionally or alternatively, the quality and conditioning provided by the input text (e.g., the text prompt described with reference to FIG. 7) are maximized. In some cases, the training dataset includes images having patterns and vector textures.

In some embodiments, a text-to-image segmentation model is used to exclude vector images having text from the training dataset. For example, the segmentation model predicts a value for each of the images in the preliminary training dataset and removes images having a value higher than a threshold value. In some cases, the value represents the likelihood of an image containing text. In some embodiments, an inpainting model is used to inpaint the text in these removed images to generate inpainted images. In one embodiment, the training dataset includes the inpainted images. By removing the images having text from the preliminary training dataset, the image generation model trained using the training dataset can generate pattern images (e.g., the pattern image described with reference to FIG. 7) having higher quality and no artifacts.

According to some embodiments, the data preparation component filters and removes images having an aesthetic score below a threshold score to generate the training dataset. For example, the data preparation component assigns labels to the preliminary training dataset based on predicted scores from a classifier. For example, the classifier is a LAION aesthetic classifier. Then, the data preparation component ranks these images and selects the top 25% of the images having the highest aesthetic score. Accordingly, the training dataset includes the ranked images.

A classifier is a machine learning model trained to categorize input data into one or more predefined classes or categories. In one aspect, the classifier learns a mapping from an input feature to class labels based on a training dataset. A pre-trained classifier is able to predict the class labels of new, unseen data. Some examples of a classifier include a binary classifier, multi-class classifier, Naive Bayes classifier, k-nearest neighbors (KNN), support vector machines (SVM), decision trees, or neural networks. The pre-trained classifier learns the relationships between input features and corresponding class labels. In some cases, the classifier is trained using machine annotations/labels or human-provided annotations/labels. In some cases, the performance of the classifier is evaluated using metrics such as accuracy, precision, recall, and F1 score on a test dataset.

At operation 1115, the system trains, using the training set, the image generation model to generate patterned text images. In some cases, the operations of this step refer to, or may be performed by, a training component as described with reference to FIG. 6. In some embodiments, the image generation model is trained to generate a pattern image based on a text prompt describing a pattern. In some embodiments, the image generation model is trained to generate a patterned text image based on the pattern text and a text image mask. Further detail on training the image generation model is described with reference to FIG. 14.

Figure 12:
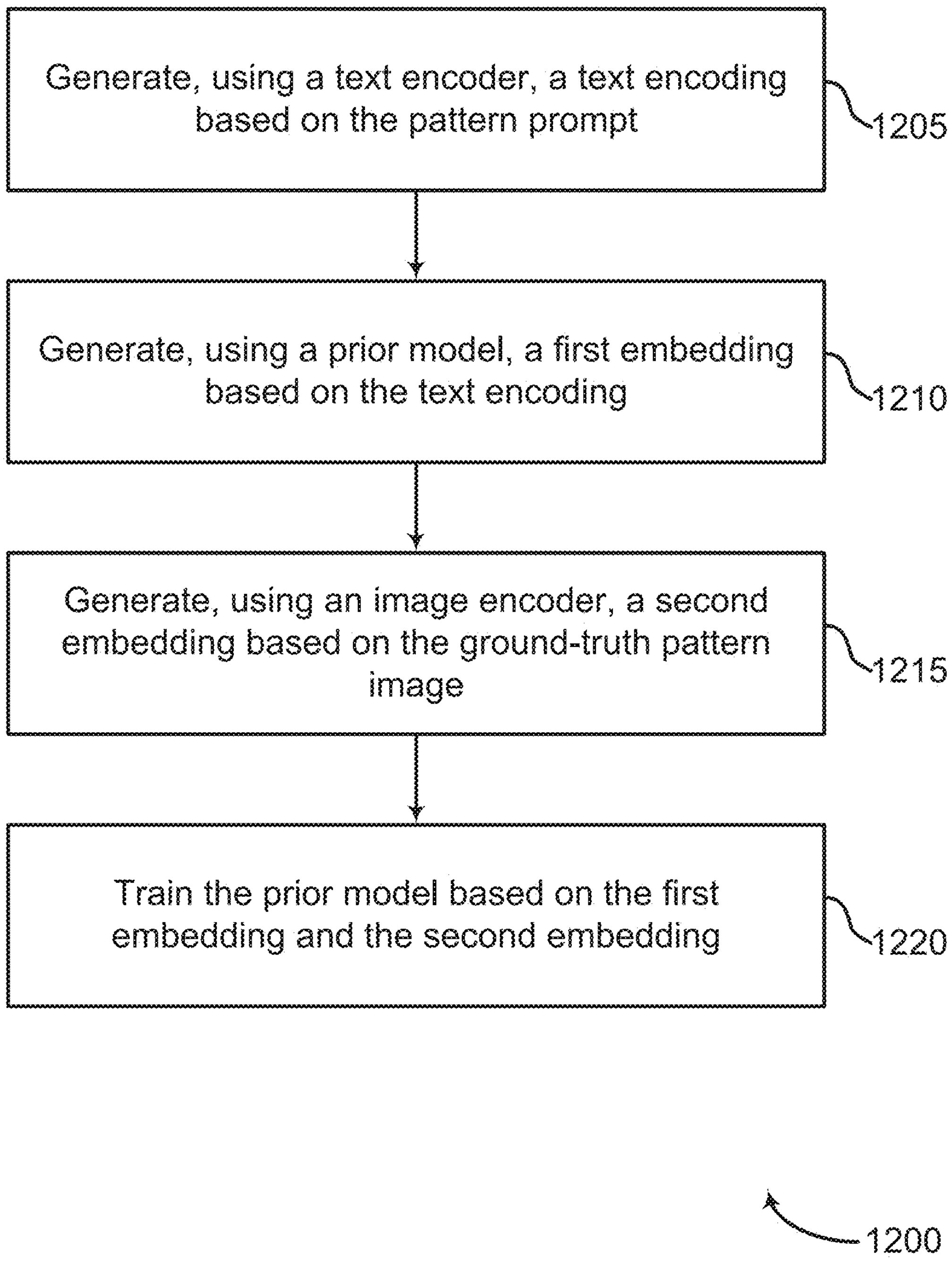
FIG. 12 shows an example of a method for training a prior model according to aspects of the present disclosure.

FIG. 12 shows an example of a method 1200 for training a prior model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system generates, using a text encoder, a text encoding based on the pattern prompt. In some cases, the operations of this step refer to, or may be performed by, a text encoder as described with reference to FIGS. 6, 8, and 13. In some cases, the text encoding is referred to as the text embedding. For example, text encoding includes semantic information and textual information of the text prompt in a low-dimensional vector space.

At operation 1210, the system generates, using a prior model, a first embedding based on the text encoding. In some cases, the operations of this step refer to, or may be performed by, a prior model as described with reference to FIGS. 6, 7, and 13. For example, the prior model converts the text encoding of the text prompt to a first image embedding. In some cases, the first image embedding includes visual information and extracted features described by the text prompt. In some cases, the first image embedding captures complex visual features in a high-dimensional vector space.

At operation 1215, the system generates, using an image encoder, a second embedding based on the ground-truth pattern image. In some cases, the operations of this step refer to, or may be performed by, an image encoder as described with reference to FIGS. 6, 8, and 13. In some cases, the ground-truth pattern image is closely correlated to the text prompt. In some cases, the image encoder generates a second image embedding based on the ground-truth pattern image. For example, the second image embedding includes visual information and extracted features of the ground-truth pattern image in high-dimensional vector space.

At operation 1220, the system trains the prior model based on the first embedding and the second embedding. In some cases, the operations of this step refer to, or may be performed by, a training component as described with reference to FIG. 6. In some cases, the training component calculates a loss between the first embedding and the second embedding. The training component fine-tunes the prior model based on the loss.

A loss or loss function refers to a function that impacts how a machine learning model is trained in a supervised learning model. For example, during each training iteration, the output of the machine learning model is compared to the known annotation information in the training data. The loss function provides a value (the "loss") for how close the predicted annotation data is to the actual annotation data. After computing the loss, the parameters of the machine learning model are updated and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. In some cases, each example is a pair comprising an input object (e.g., a vector) and a desired output value (e.g., a single value or an output vector). In some cases, a supervised learning algorithm analyzes the training data and produces the inferred function, which can be used for mapping new examples. In some cases, the learning results in a function that correctly determines the class labels for unseen instances. For example, the learning algorithm generalizes from the training data to unseen examples. In some cases, the training component updates the image generation parameters of the image generation model based on the loss.

Figure 13:
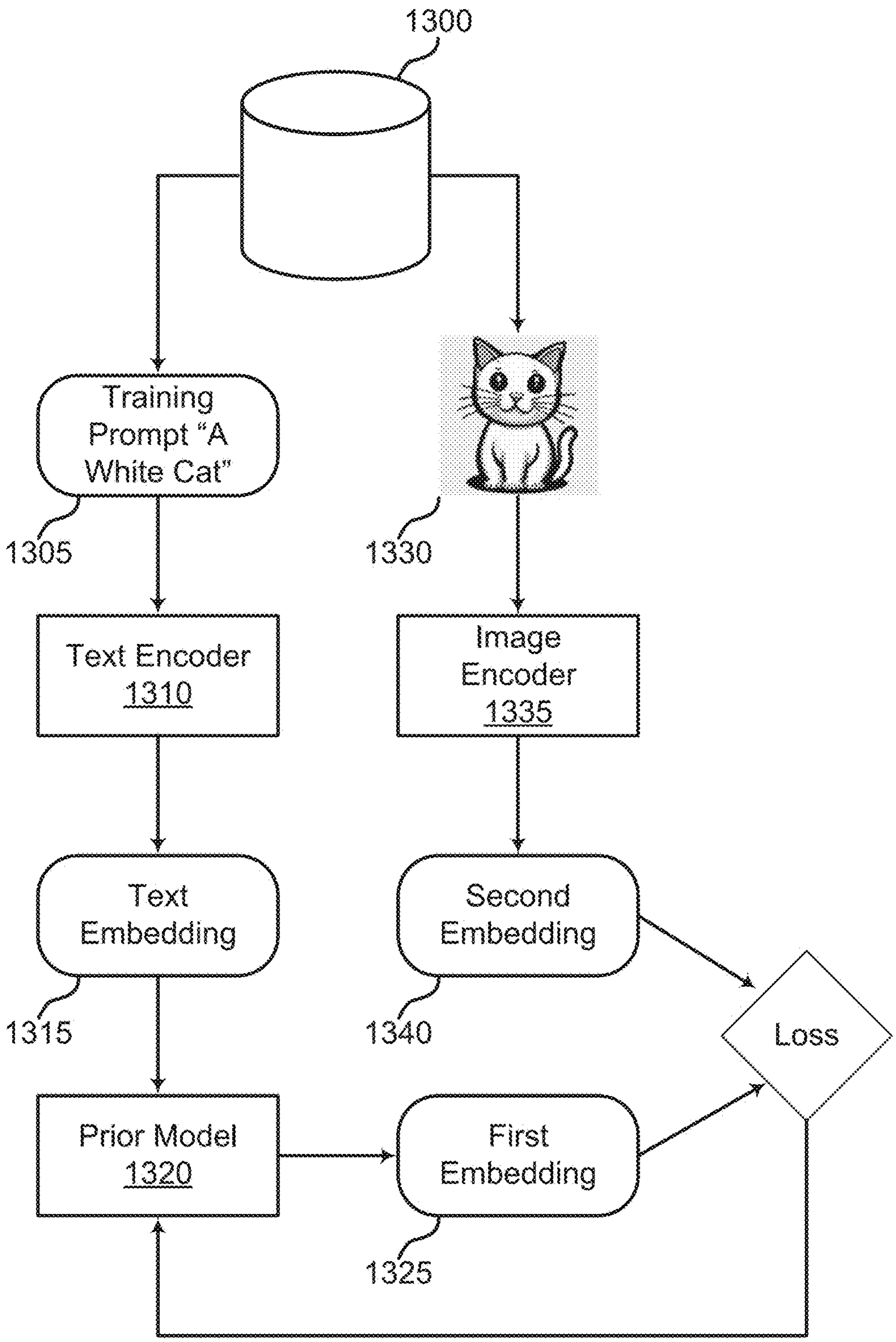
FIG. 13 shows an example of training a prior model according to aspects of the present disclosure.

FIG. 13 shows an example of training a prior model 1320 according to aspects of the present disclosure. The example shown includes training data 1300, training prompt 1305, text encoder 1310, text embedding 1315, prior model 1320, first embedding 1325, training image 1330, image encoder 1335, and second embedding 1340.

Referring to FIG. 13, prior model 1320 is fine-tuned based on training data 1300 (e.g., training dataset described with reference to FIG. 11). For example, training prompt 1305 is obtained from training data 1300. In some cases, training prompt 1305 is a text description that describes training image 1330. For example, training prompt 1305 states "A white cat." Text encoder 1310 receives training prompt 1305 and generates text embedding 1315 based on training prompt 1305. In some cases, text embedding 1315 includes semantic information and textual information of training prompt 1305 in a low-dimensional vector space.

Prior model 1320 receives text embedding 1315 and generates first embedding 1325. In some cases, first embedding 1325 is an image embedding. In one aspect, prior model 1320 is trained and configured to covert a text embedding (e.g., text embedding 1315) to an image embedding (e.g., first embedding 1325). For example, an image embedding has more visual information and extracted features than that of the text embedding. In some cases, the image embedding is used as a style embedding in the last neural network layer of a U-Net of an image generation model to control style and content.

Training image 1330 is obtained from training data 1300. For example, training image 1330 depicts a white cat. Image encoder 1335 generates second embedding 1340 based on training image 1330. In some cases, second embedding 1340 is an image embedding of training image 1330. For example, second embedding 1340 includes visual information and extracted features of training image 1330 in a high-dimensional vector space.

According to some embodiments, a loss is computed based on first embedding 1325 and second embedding 1340. The loss is backpropagated to prior model 1320. As a result, prior model 1320 is fine-tuned based on the loss. In some cases, prior model 1320 affects the general style of the generated image (for example, generated using the image generation model). By training prior model 1320 using training data 1300 that includes ground-truth images having a high aesthetic score, patterned texture, and/or vectorized pattern, prior model 1320 learns to generate image embeddings having a same or similar visual feature as the ground-truth image. In some cases, prior model 1320 is trained using a batch size of 640 image-text pairs.

Training data 1300 is an example of, or includes aspects of, the corresponding element described with reference to FIGS. 14 and 15. Training prompt 1305 is an example of, or includes aspects of, the corresponding element described with reference to FIGS. 14 and 15. Text encoder 1310 is an example of, or includes aspects of, the corresponding element described with reference to FIGS. 6 and 8. Text embedding 1315 is an example of, or includes aspects of, the corresponding element described with reference to FIG. 7.

Prior model 1320 is an example of, or includes aspects of, the corresponding element described with reference to FIGS. 6 and 7. Training image 1330 is an example of, or includes aspects of, the corresponding element described with reference to FIGS. 14 and 15. Image encoder 1335 is an example of, or includes aspects of, the corresponding element described with reference to FIGS. 6 and 8.

Figure 14:
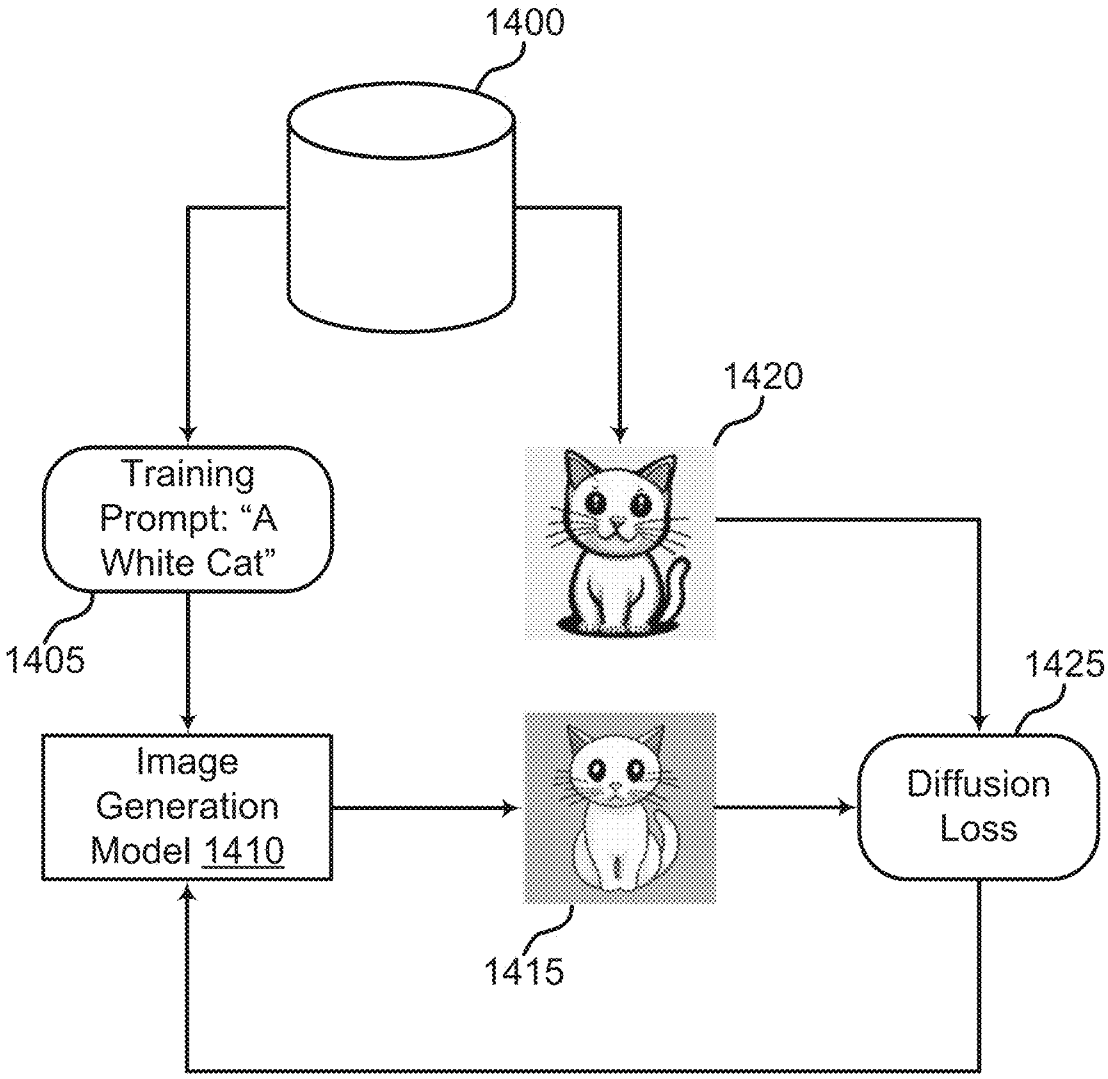
FIG. 14 shows an example of training an image generation model according to aspects of the present disclosure.

FIG. 14 shows an example of training an image generation model according to aspects of the present disclosure. The example shown includes training data 1400, training prompt 1405, image generation model 1410, synthetic image 1415, training image 1420, and diffusion loss 1425.

Referring to FIG. 14, image generation model 1410 is fine-tuned based on training data 1400 (e.g., training dataset described with reference to FIG. 11). For example, training prompt 1405 is obtained from training data 1400. In some cases, training prompt 1405 is a text description that describes training image 1420. For example, training prompt 1405 states "A white cat." Image generation model 1410 receives training prompt 1405 and generates synthetic image 1415 based on training prompt 1405. Synthetic image 1415 is an example of, or includes aspects of, the output image described with reference to FIG. 8. In some cases, synthetic image 1415 depicts a white cat.

Training image 1420 is obtained from training data 1400. For example, training image 1420 depicts a white cat. Training image 1420 (sometimes referred to as the ground-truth training image) is compared to synthetic image 1415 to calculate diffusion loss 1425. In some cases, diffusion loss 1425 is used to update or fine-tune parameters of image generation model 1410. In some cases, image generation model 1410 is trained using a batch size of 384 text-image pairs.

In one aspect, diffusion loss 1425 includes a cosine similarity loss. For example, cosine similarity loss measures the cosine of the angle between two vectors (e.g., embeddings). Cosine similarity loss captures similarity in the distribution of pixel values. In some cases, cosine similarity loss is used to compare images based on the content. In one aspect, diffusion loss 1425 includes a mean squared error (MSE) loss. For example, MSE loss computes the average of the squared difference between pixel values of corresponding pixels in two images. In some cases, MSE loss is used to compare images in pixel space.

Training data 1400 is an example of, or includes aspects of, the corresponding element described with reference to FIGS. 13 and 15. Training prompt 1405 is an example of, or includes aspects of, the corresponding element described with reference to FIGS. 13 and 15. Image generation model 1410 is an example of, or includes aspects of, the corresponding element described with reference to FIGS. 3, 4, 6, and 7. Training image 1420 is an example of, or includes aspects of, the corresponding element described with reference to FIGS. 13 and 15.

FIG. 15 shows an example of training an upsampling model 1515 according to aspects of the present disclosure. The example shown includes training data 1500, training prompt 1505, training image 1510, upsampling model 1515, negative sample 1520, resized training image 1525, and upsampling discriminator 1530.

Referring to FIG. 15, upsampling model 1515 is fine-tuned based on training data 1500 (e.g., training dataset described with reference to FIG. 11). For example, training prompt 1505 is obtained from training data 1500. In some cases, training prompt 1505 is a text description that describes training image 1510. For example, training prompt 1505 states "A white cat." Training image 1510 is obtained from training data 1500. For example, training image 1510 depicts a white cat. In some cases, training image 1510 is a low-resolution image (e.g., having a dimension of 128×128).

Upsampling model 1515 receives training prompt 1505 and training image 1510 to generate negative sample 1520. For example, upsampling model 1515 generates negative sample 1520 that includes a high-resolution image of training image 1510. Negative sample 1520 is input into upsampling discriminator 1530. In one aspect, resized training image 1525 is obtained from training data 1500. In some examples, resized training image 1525 and negative sample 1520 have the same resolution (e.g., 1024×1024). In some cases, resized training image 1525 is used as a positive sample to upsampling discriminator 1530. Upsampling discriminator 1530 is trained to distinguish between the positive sample and the negative sample 1520 generated by upsampling model 1515. Upsampling discriminator 1530 generates a generative adversarial loss based on the positive sample and negative sample 1520. Upsampling model 1515 is fine-tuned using the generative adversarial loss.

During training, upsampling model 1515 is trained to minimize a loss that encourages upsampling discriminator 1530 to classify negative sample 1520 as a real image (e.g., resized training image 1525). Additionally, upsampling discriminator 1530 is trained to minimize the loss by correctly identifying the real image (e.g., resized training image 1525) and fake image (e.g., negative sample 1520). In some cases, for example, upsampling model 1515 is trained with a batch size of 192 image-text pairs. In some aspects, images generated using upsampling model 1515 have clearer edges, quantized gradients in multiple colors, reduced generation of artifacts, and improved overall image quality.

Training data 1500 is an example of, or includes aspects of, the corresponding element described with reference to FIGS. 13 and 14. Training prompt 1505 is an example of, or includes aspects of, the corresponding element described with reference to FIGS. 13 and 14. Training image 1510 is an example of, or includes aspects of, the corresponding element described with reference to FIGS. 13 and 14. Upsampling model 1515 is an example of, or includes aspects of, the corresponding element described with reference to FIGS. 6 and 7.

Computing Device

FIG. 16 shows an example of a computing device 1600 according to aspects of the present disclosure. The example shown includes computing device 1600, processor 1605, memory subsystem 1610, communication interface 1615, I/O interface 1620, user interface component 1625, and channel 1630.

In some embodiments, computing device 1600 is an example of, or includes aspects of, the image processing apparatus described with reference to FIGS. 1 and 6. In some embodiments, computing device 1600 includes processor 1605 that can execute instructions stored in memory subsystem 1610 to obtain a pattern prompt and a text image, where the pattern prompt describes a visual pattern and the text image depicts text. The instructions further include to generate a pattern image based on the pattern prompt, where the pattern image depicts the visual pattern. The instructions further include to generate a patterned text image based on the pattern image and the pattern prompt.

According to some embodiments, processor 1605 includes one or more processors. In some cases, processor 1605 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, processor 1605 is configured to operate a memory array using a memory controller. In other cases, a memory controller is integrated into processor 1605. In some cases, processor 1605 is configured to execute computer-readable instructions stored in a memory to perform various functions. In some embodiments, processor 1605 includes special-purpose components for modem processing, baseband processing, digital signal processing, or transmission processing. Processor 1605 is an example of, or includes aspects of, the processor unit described with reference to FIG. 6.

According to some embodiments, memory subsystem 1610 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1610 is an example of, or includes aspects of, the memory unit described with reference to FIG. 6.

According to some embodiments, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1615.

According to some embodiments, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or hardware components controlled by the I/O controller.

According to some embodiments, user interface component 1625 enables a user to interact with computing device 1600. In some cases, user interface component 1625 includes an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over existing technology (e.g., conventional image generation models). Example experiments demonstrate that the image processing apparatus based on the present disclosure outperforms conventional image generation models. Details on the example use cases based on embodiments of the present disclosure are described with reference to FIGS. 3 and 4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a pattern prompt and a text image, wherein the pattern prompt describes a visual pattern and the text image depicts text;

generating, using a prior model, a first embedding based on a text encoding of the pattern prompt, wherein the prior model is trained based on the first embedding and a second embedding of a ground-truth pattern image depicting the visual pattern, generating, using an image generation model comprising a machine learning model implemented by a computing device, a pattern image based on the pattern prompt, wherein the pattern image depicts the visual pattern; and generating, using the image generation model, a patterned text image based on the pattern image and the pattern prompt, wherein the patterned text image depicts a text character from the text of the text image, and wherein the text character has the visual pattern from the pattern image.

2. The method of claim 1, wherein generating the pattern image comprises:

generating a positive conditioning embedding based on the pattern prompt; and generating a negative conditioning embedding based on a negative prompt, wherein the image generation model generates the pattern image based on the positive conditioning embedding and the negative conditioning embedding.

3. The method of claim 2, wherein:

the image generation model generates the patterned text image based on the positive conditioning embedding and the negative conditioning embedding.

4. The method of claim 1, wherein generating the patterned text image comprises:

combining the pattern image and the text image to obtain a preliminary patterned text image, wherein the patterned text image is generated based on the preliminary patterned text image.

5. The method of claim 1, wherein obtaining the text image comprises:

arranging a plurality of characters of the text to minimize a background region of the text image.

6. The method of claim 1, further comprising:

generating a vector patterned text image based on the patterned text image.

7. The method of claim 6, further comprising:

upscaling the patterned text image to obtain an upscaled patterned text image, wherein the vector patterned text image is generated based on the upscaled patterned text image.

8. The method of claim 6, further comprising:

segmenting the patterned text image to obtain a plurality of patterned character images, wherein the vector patterned text image is generated based on the plurality of patterned character images.

9. The method of claim 1, wherein:

the image generation model is trained to generate text effects using a training set that includes the ground-truth pattern image and the pattern prompt.

10. A method comprising:

obtaining a training set that includes a ground-truth pattern image and a pattern prompt, wherein the ground-truth pattern image depicts a visual pattern and the pattern prompt describes the visual pattern;

generating, using a text encoder, a text encoding based on the pattern prompt;

generating, using a prior model, a first embedding based on the text encoding;

generating, using an image encoder, a second embedding based on the ground-truth pattern image;

training the prior model based on the first embedding and the second embedding; and training, using the training set and the trained prior model, an image generation model to generate patterned text images, wherein training the image generation model comprises computing a diffusion loss, and updating parameters of the image generation model based on the diffusion loss.

11. The method of claim 10, wherein obtaining the training set comprises:

filtering a set of images to remove images depicting text, wherein the training set excludes the removed images.

12. The method of claim 10, wherein obtaining the training set comprises:

generating an aesthetic score for each of a set of images; and filtering the set of images to remove images if the aesthetic score is below a threshold, wherein the training set excludes the removed images.

13. The method of claim 10, further comprising:

training an upsampling model using a generative adversarial loss.

14. An apparatus comprising:

at least one processor;

at least one memory storing instructions executable by the at least one processor;

a prior model comprising parameters stored in the at least one memory and trained to generate a first embedding based on a text encoding of a pattern prompt, and trained based on the first embedding and a second embedding of a ground-truth pattern image depicting a visual pattern; and an image generation model comprising parameters stored in the at least one memory and trained to generate a pattern image based on the pattern prompt, wherein the pattern image depicts the visual pattern, and trained to generate a patterned text image based on the pattern image and the pattern prompt, wherein the patterned text image depicts a text character from a text image, and wherein the text character has the visual pattern from the pattern image.

15. The apparatus of claim 14, wherein:

the image generation model comprises a first image generation model configured to generate the pattern image, and a second image generation model configured to generate the patterned text image.

16. The apparatus of claim 14, wherein:

the prior model trained to generate a conditioning embedding for the image generation model.

17. The apparatus of claim 14, further comprising:

an upsampling model trained to upscale the patterned text image to obtain an upscaled patterned text image.

18. The apparatus of claim 14, further comprising:

a vectorization component configured to generate a vector patterned text image based on the patterned text image.

* * * * *